(12) United States Patent
Savstrom et al.

(10) Patent No.: US 10,112,130 B2
(45) Date of Patent: Oct. 30, 2018

(54) SELF-SUPPORTING FOLDED SHEET MATERIAL, FILTER ELEMENTS, AND METHODS

(71) Applicant: Donaldson Company, Inc., Minneapolis, MN (US)

(72) Inventors: Jacob C. Savstrom, Plymouth, MN (US); Robin Glisson, Capetown (ZA)

(73) Assignee: Donaldson Company, Inc., Minneapolis, MN (US)

( * ) Notice: Subject to any disclaimer, the term of this patent is extended or adjusted under 35 U.S.C. 154(b) by 530 days.

(21) Appl. No.: 14/433,980

(22) PCT Filed: Oct. 9, 2013

(86) PCT No.: PCT/US2013/064124
§ 371 (c)(1),
(2) Date: Apr. 7, 2015

(87) PCT Pub. No.: WO2014/059014
PCT Pub. Date: Apr. 17, 2014

(65) Prior Publication Data
US 2015/0251111 A1    Sep. 10, 2015

(30) Foreign Application Priority Data

Oct. 9, 2012 (ZA) ................................ 2012/07631

(51) Int. Cl.
*B01D 29/21* (2006.01)
*B01D 46/24* (2006.01)
(Continued)

(52) U.S. Cl.
CPC .......... *B01D 29/213* (2013.01); *B01D 29/111* (2013.01); *B01D 29/21* (2013.01);
(Continued)

(58) Field of Classification Search
CPC .............. B01D 29/213; B01D 46/2411; B01D 46/522; B01D 29/21; B01D 29/111;
(Continued)

(56) References Cited

U.S. PATENT DOCUMENTS 2,556,521 A   6/1951 Chase
2,683,537 A   7/1954 Dobrolet
(Continued)

FOREIGN PATENT DOCUMENTS

DE    19849998 A1   5/2000
DE    200 05 756 U1  8/2000
(Continued)

OTHER PUBLICATIONS

International Search Report for PCT/US2015/024908, dated Oct. 8, 2015.
(Continued)

*Primary Examiner* — Krishnan S Menon
*Assistant Examiner* — Waqaas Ali
(74) *Attorney, Agent, or Firm* — Merchant & Gould P.C.

(57) ABSTRACT

A pleated media pack includes a section of media configured into a tube defining an interior volume and an open opening at one end. A ratio of the pleat depth to a diameter of the opening is greater than 0.2. At least some of the pleats at one end of the media pack are inverted. In some examples, the pleats include major pleats alternating with minor pleats.

12 Claims, 30 Drawing Sheets

(51) Int. Cl.
    *B01D 46/52* (2006.01)
    *B01D 29/11* (2006.01)
(52) U.S. Cl.
    CPC ........ *B01D 46/2411* (2013.01); *B01D 46/522* (2013.01); *B01D 46/523* (2013.01); *B01D 2201/02* (2013.01); *B01D 2201/12* (2013.01); *B01D 2201/122* (2013.01); *B01D 2201/127* (2013.01)
(58) Field of Classification Search
    CPC ............ B01D 46/523; B01D 2201/127; B01D 2201/122; B01D 2201/02; B01D 2201/12
    See application file for complete search history.

(56) References Cited

U.S. PATENT DOCUMENTS

| | | | |
|---|---|---|---|
| 2,862,624 A | 12/1958 | Stokes | |
| 2,936,855 A | 5/1960 | Allen et al. | |
| 2,980,208 A | 4/1961 | Neumann | |
| 3,058,594 A | 10/1962 | Hultgren | |
| 3,124,441 A | 3/1964 | Rivers | |
| 3,386,232 A | 6/1968 | Gaines, Jr. | |
| 3,401,803 A | 9/1968 | Bub | |
| 3,410,062 A | 11/1968 | Hart | |
| 3,440,807 A | 4/1969 | Gaines, Jr. | |
| 3,531,920 A | 10/1970 | Hart | |
| 3,640,396 A | 2/1972 | Brownell | |
| 3,937,663 A | 2/1976 | Bessiere | |
| 4,012,932 A | 3/1977 | Gewiss | |
| 4,640,779 A | 2/1987 | Taki et al. | |
| 4,673,503 A | 6/1987 | Fujimoto | |
| 4,734,195 A | 3/1988 | Lhuillier et al. | |
| 4,925,561 A | 5/1990 | Ishii et al. | |
| 5,128,039 A | 7/1992 | Gabrielson | |
| 5,230,455 A | 7/1993 | Price | |
| 5,306,321 A | 4/1994 | Osendorf | |
| 5,522,909 A * | 6/1996 | Haggard | B01D 46/0043 55/327 |
| 5,632,793 A * | 5/1997 | Haggard | |
| 5,804,073 A | 9/1998 | Ter Horst | |
| 5,902,365 A | 5/1999 | Haggard | |
| 6,641,637 B2 | 11/2003 | Kallsen et al. | |
| 6,790,397 B2 | 9/2004 | Richerson et al. | |
| 6,824,581 B1 | 11/2004 | Tate et al. | |
| 2004/0134171 A1* | 7/2004 | Scott | B01D 46/0001 55/482 |
| 2007/0278149 A1 | 12/2007 | Kuwabara et al. | |
| 2011/0186504 A1 | 8/2011 | Rocklitz | |
| 2015/0251111 A1 | 9/2015 | Savstrom et al. | |

FOREIGN PATENT DOCUMENTS

| | | |
|---|---|---|
| EP | 0 206 182 B1 | 3/1990 |
| EP | 1 197 254 A1 | 4/2002 |
| EP | 1 681 087 A2 | 7/2006 |
| EP | 2 042 359 A1 | 4/2009 |
| FR | 795282 A | 3/1936 |
| FR | 1 288 229 A | 3/1962 |
| FR | 2 791 579 A1 | 10/2000 |
| JP | 6-79836 | 10/1994 |
| JP | 07008735 A * | 1/1995 |
| WO | 95/17945 A2 | 7/1995 |
| WO | 00/40319 A2 | 7/2000 |
| WO | 2005/037408 | 4/2005 |
| WO | 2014059014 A1 | 4/2014 |
| WO | 2015/157408 A2 | 10/2015 |

OTHER PUBLICATIONS

International Search Report for PCT/US2013/064124, dated Jan. 14, 2014.

* cited by examiner

A-A

SELF-SUPPORTING FOLDED SHEET MATERIAL, FILTER ELEMENTS, AND METHODS

This application is being filed on 7 Apr. 2015, as a US National Stage application of PCT International patent application No. PCT/US2013/064124, filed 9 Oct. 2013 which claims priority to South African Provisional Application Serial Number ZA 2012/07631, filed Oct. 9, 2012 and which applications are incorporated herein by reference. To the extent appropriate, a claim of priority is made to each of the above disclosed applications.

TECHNICAL FIELD

This disclosure relates to sheet material that is folded to maintain a degree of structural integrity and while the disclosure is aimed primarily at pleated filtration media used in media packs, filter elements, and methods of their manufacture, the disclosure can also be applied in other instances, where a folded sheet material can benefit from the structural integrity, flexibility and resilience offered by the present disclosure.

BACKGROUND

Permeable sheets of filtration media are used widely to remove contaminants from fluid streams and in order to achieve optimal performance of the filtration media, the surface of the sheet that is exposed to the fluid stream needs to be large, but in order to avoid excessive size of filtration elements, the sheets need to fit into small volumes and are typically pleated to maximize the ratios between filtration surfaces exposed to the fluid streams and the overall dimensions of the filtration elements.

When exposed to fluid steams, these filtration elements and the permeable sheets in them are exposed to forces from the fluid streams and need to withstand these forces sufficiently to ensure continued acceptable operation of the filter element. In particular, pleated sheets of permeable filtration media are often prone to deflection and adjacent sheets are often too close together or touch and thus prevent a well dispersed flow pattern of the fluid—and reduce the available surface area of the filtration media for loading—a phenomenon known as "masking". Further, in order to be cost effective, filtration elements made from sheets of permeable filtration media typically do not include structural supports for the filtration media, but rely on the structural integrity of the folded sheets themselves.

Pleated filtration media are typically formed from continuous or rolled webs and pleats are formed perpendicular to the "machine" or "reel" direction of the media, i.e. to the continuous direction of the media as it comes from a source, such as a supply reel. Simple alternating "zigzag" pleats are commonly used and are simple to form, but are prone to deflection and masking, especially in cases of deep pleats. Some methods have been proposed to inhibit deflection and/or retain spacing between adjacent pleats, but these methods tend to require complex (and thus costly) manufacturing methods (e.g. because they require adjacent layers of pleated filtration media to be attached together with adhesive), they are not versatile because their geometry is static, and/or they are prone to crushing and collapsing. The present disclosure seeks to address at least some of the challenges mentioned above and in particular to provide elements of folded sheet material with improved structural stiffness, flexibility and compressibility, or maximizing surface area, which can be manufactured cost-effectively.

Some techniques used previously include those described in U.S. Pat. No. 2,683,537 and U.S. Pat. No. 5,522,909, incorporated by reference herein.

SUMMARY

Pleated media packs for use in filter elements are provided.

In general, in one example, a section of filtration media is folded in the pleats, with at least some pleats having a major pleat depth. The section of filtration media can be configured into a tube defining an interior volume with first and second opposite ends. An opening is at the first end. The opening has a diameter. A ratio of the pleat depth to the opening diameter is greater than 0.2. At least some of the pleats at one end of the media pack are inverted.

In general, in some implementations, the pleats will include major pleats defining the major pleat depth, and minor pleats having a minor pleat depth less than the major pleat depth.

In general, in some implementations, at least some of the pleats at the first end are inverted an opposite direction of the rest of the pleat, along at least a portion of the pleat length from the first end toward the second end.

In general, the second end will typically not have inverted pleats.

In some implementations, at least either the major pleats or minor pleats at the first end are inverted. In some implementations, only one of the major pleats or minor pleats is inverted. In some implementations, both the major pleats and minor pleats are inverted an opposite direction of the rest of the pleat, along at least a portion of the pleat length from the first end toward the second end.

Filter elements can be constructed from media packs as characterized above. In one example, the filter element has a first open end cap secured to the first end of the media pack, and a second end cap secured to the second end of the media pack.

In some implementations, the first open end cap defines an outlet opening for an exit of filtered fluid.

It is noted that not all the specific features described herein need to be incorporated in an arrangement for the arrangement to have some selected advantage according to the present disclosure.

DETAILED DESCRIPTION

A. FIGS. 1-21

Figure 1:
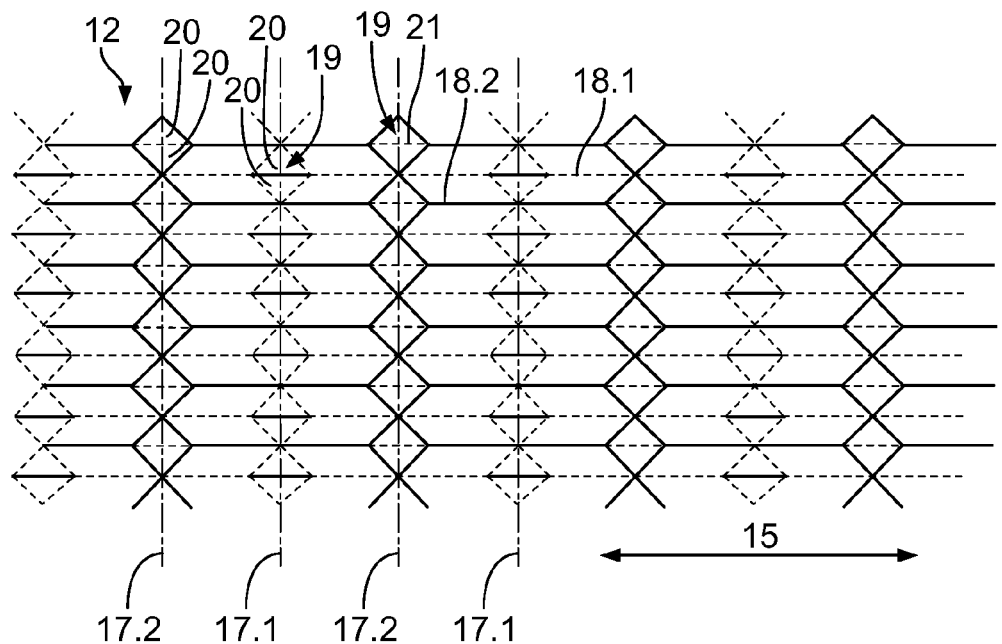
FIG. 1 shows a scoring pattern to be applied to a sheet of filtration medium, according to the present disclosure.

Referring to the drawings, a sheet 12 of permeable filter material is fed from a suitable feed stock of a filter medium, such as a reel and is scored on opposing sides of the sheet as shown in FIG. 1. The score lines shown in solid lines are for folding the sheet 12 in one direction and the score lines shown in broken lines are for folding the sheet in the opposite direction—i.e. the scoring patterns in solid lines and in broken lines are made on opposing sides of the sheet. Additional chevron score lines 13 can be formed on the sheet 12, as shown in FIG. 2, if desired.

Figure 2:
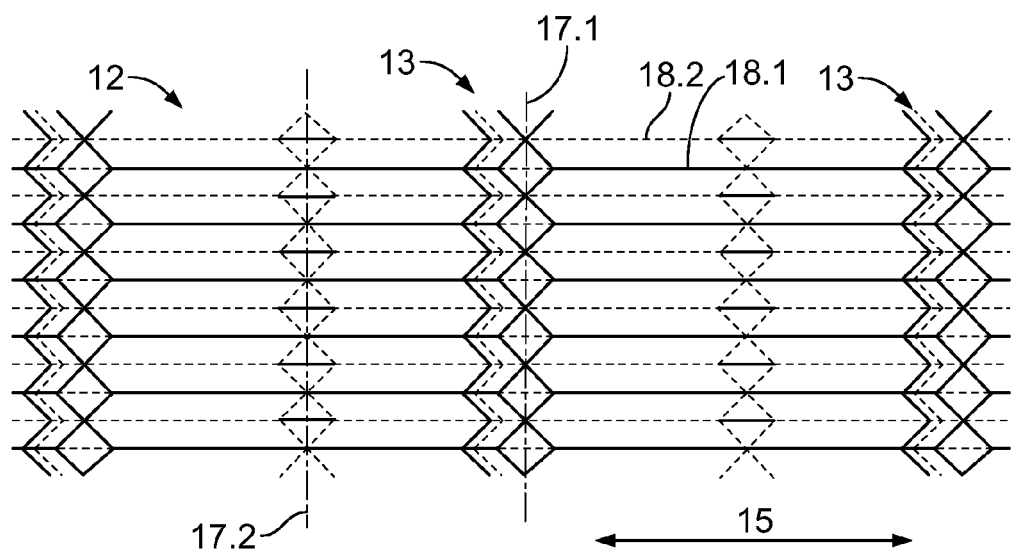
FIG. 2 shows a variation on the scoring pattern of FIG. 1.

The score patterns can be made with the majority of lines aligned with the machine or reel direction (shown in FIGS. 1 and 2 with reference numeral 15), or if desired, the score pattern can be made with an orientation relative to the reel direction that is perpendicular to that shown in FIGS. 1 and 2.

Figure 3:
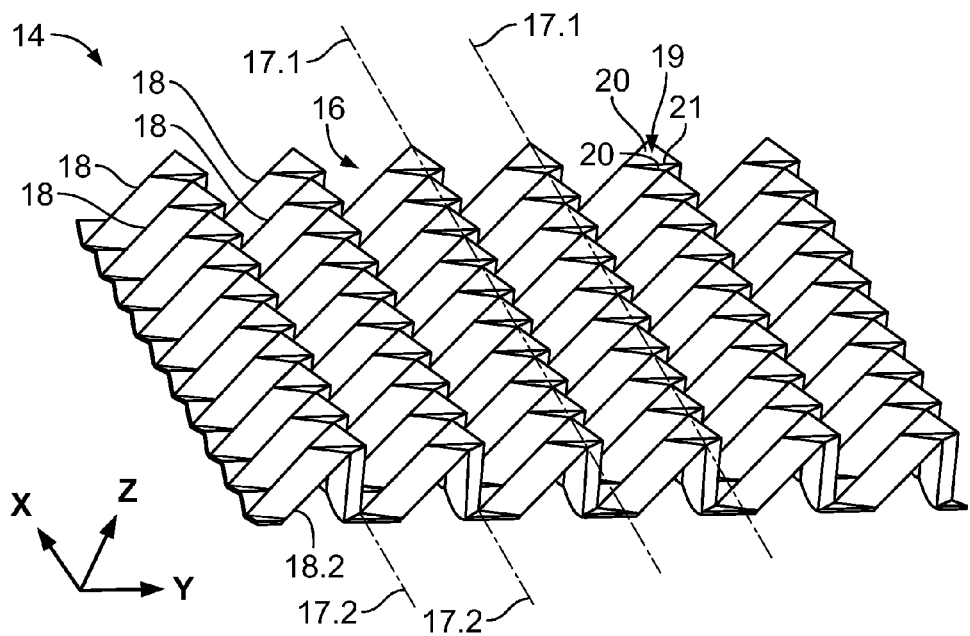
FIG. 3 shows a three dimensional view of the sheet of filtration medium of FIG. 15 1, which has been folded according to the present disclosure.
Figure 4:
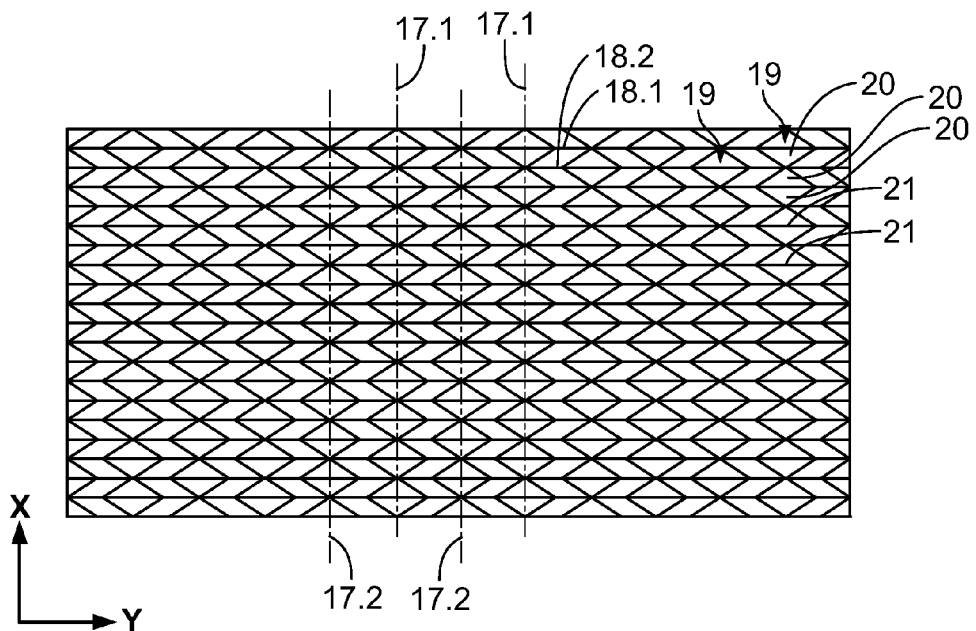
FIG. 4 is a plan view of the folded sheet material of FIG. 3.
Figure 5:
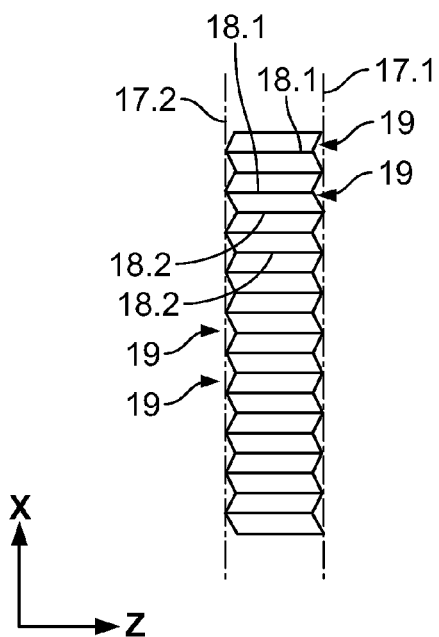
FIG. 5 is an end view of the folded sheet material of FIG. 3.

The scored sheet 12 is pressed to fold along the score lines and the folded sheet forms a filtration pack or element 14 as shown in FIGS. 3 to 5. With reference to FIGS. 1 to 5, the filtration element 14 includes a major pleated structure, a minor pleated structure and a plurality of indentations—all of which are formed simultaneously by folding the sheet 12 along the score lines. The major pleated structure is made up of a number of inclined walls 16 that extend in an alternating or zigzag configuration between parallel major pleats 17:

The walls 16 are not planar and the pleats 17 are not linear and in order to assist in identifying them in the drawings, the pleats are identified by broken lines, with suffixes identifying the side of the filter element towards which the pleat protrudes. Pleats 17.1 protrudes upwards in the illustrated example and pleats 17.2 protrude downwards, with the sheet 12 and thus the filtration element 14 extending horizontally in an X-V plane and the upward and downward directions being in the Z direction, with reference to X, Y, and Z directions shown in FIGS. 3 to 4. Each inclined wall 16 extends between a major pleat 17.1 along its top and an opposing major pleat 17.2 along its bottom. The minor pleated structure is made up of alternating or zigzagging minor pleats 18 formed in each of the inclined walls 16. Each of the minor pleats 18 protrude towards opposing sides of the sheet 12 in alternating fashion and for ease of reference, minor pleats that protrude upwardly are identified in the drawings with reference number 18.1 and minor pleats protruding downwardly are identified with reference number 18.2.

Each of the minor pleats 18 extends transversely between the two major pleats 17 at the opposing upper and lower edges of the inclined wall 16. The upwardly facing minor pleats 18.1 of adjacent inclined walls 16 are aligned in the Y direction and likewise, the downwardly facing minor pleats 18.2 are aligned in the Y direction.

Along each of the major pleats 17, a plurality of generally diamond-shaped indentations 19 are formed from the sheet 12. Each indentation 19 is made up of two isosceles triangles 20, on opposing sides of a common base line 21.

For the indentations 19 along the upper major pleats 17.1, each base line 21 extends between upwardly protruding minor pleats 18.1 on opposing sides of the major pleat 17.1. The base line 21 is also aligned with the minor pleats 18.1 in the Y direction. The apex of each triangle 20 is at the junction where downwardly protruding minor pleats 18.2 on opposing sides of the major pleat 17.1 intersect.

The indentations in the major pleats 17 at the top and bottom of the filtration element 14 are identical, but for the sake of completeness: for the indentations 19 along the lower major pleats 17.2, each base line 21 extends between downwardly protruding minor pleats 18.2 on opposing sides of the major pleat 17.2. The base line 21 is also aligned with the minor pleats 18.2 in the Y direction. The apex of each triangle 6 is at the junction where upwardly protruding minor pleats 18.1 on opposing sides of the major pleat 17.2 intersect.

When folding the sheet 12, the minor pleats 18 are formed first off the roll of sheet material in the Y direction (which is aligned with the machine reel direction 15 in the illustrated example) and subsequently, the major pleats 17 are formed in the Z direction.

Therefore, as can be seen from the above, there is provided a continuous sheet that has been folded to form: a major pleated structure comprising inclined walls that are connected continuously at generally parallel alternating major pleats, said major pleats extending along opposing edges of each inclined wall and said major pleats protruding towards opposing sides of the sheet in alternating fashion; a minor pleated structure formed in each of the inclined walls of the major pleated structure, with alternating minor pleats formed in each of said inclined walls, each of said minor pleats protruding towards opposing sides of the sheet in alternating fashion and each of said minor pleats extending transversely between the major pleats at opposing edges of the inclined wall, with minor pleats of adjacent inclined walls being generally aligned on opposing sides of each major pleat; and indentations formed along each major pleat, each indentation comprising two triangles on opposing sides of a common base line, said base line extending between and being aligned with two minor pleats, said minor pleats being on opposing sides of the major pleat and said minor pleats protruding towards the same side of the sheet as the major pleat, and the apex of each of said two triangles being at the junction of two aligned minor pleats that protrude towards the side of the sheet that is opposite from the side towards which the major pleat protrudes.

The dimensions and proportions of the score patterns shown in FIGS. 1 and 2 and thus of the filtration element 14 can be varied, to suit different applications. In particular, the diamond shapes (the "diamonds" being formed by the isosceles triangles 20) of the indentations 19 can be varied to adjust the ultimate folding angle of the major pleats 17. Further, the zigzag configurations of the major and minor pleats 17, 18, as well as the indentations 19, allow the filtration element 14 to be compressed or expanded easily in the X and Y directions or to be curved in any direction and the resilience of the sheet material 12 causes the major and minor pleats 17, 18 to remain spaced apart generally equally.

The chevron score lines 13 shown at each alternate major pleat 17 in FIG. 2 can be advantageous in opening up the upstream ends of the major pleats, to reduce pressure drop and provide greater volume for contaminant collection. Once the filtration element 14 has been folded, as shown in FIGS. 3 to 5, it can then subsequently be cut, compressed and assembled into the various configurations, of which some examples are shown in FIGS. 6 to 11.

Figure 6:
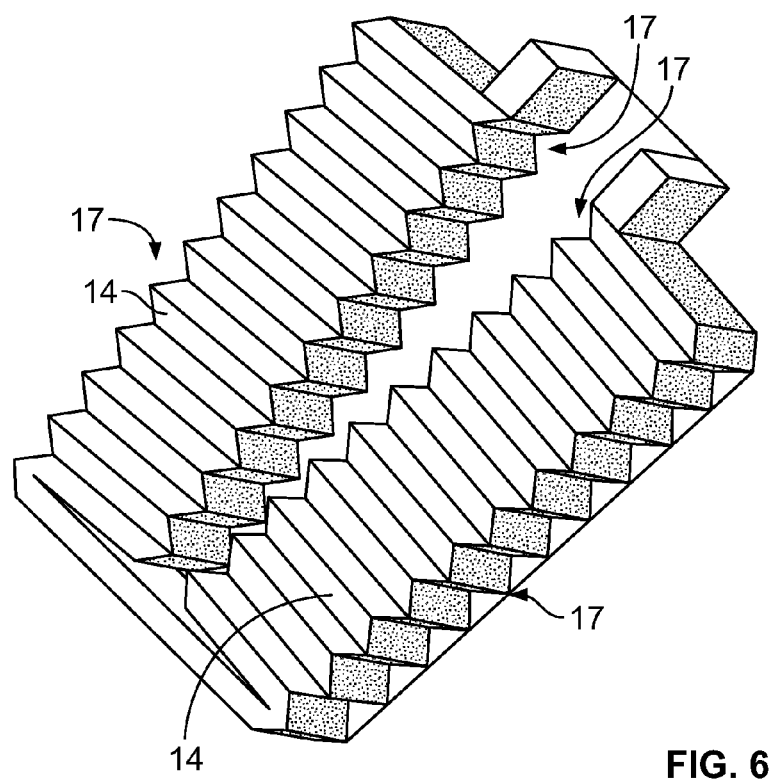
FIG. 6 shows a "V-pack" filter element which includes a sheet of filtration medium folded according to the present disclosure.

FIG. 6 shows a V-pack filter element with major pleats 17 facing inwardly and outwardly on two filtration elements 14 that extend at an acute angle relative to each other.

Figure 7A:
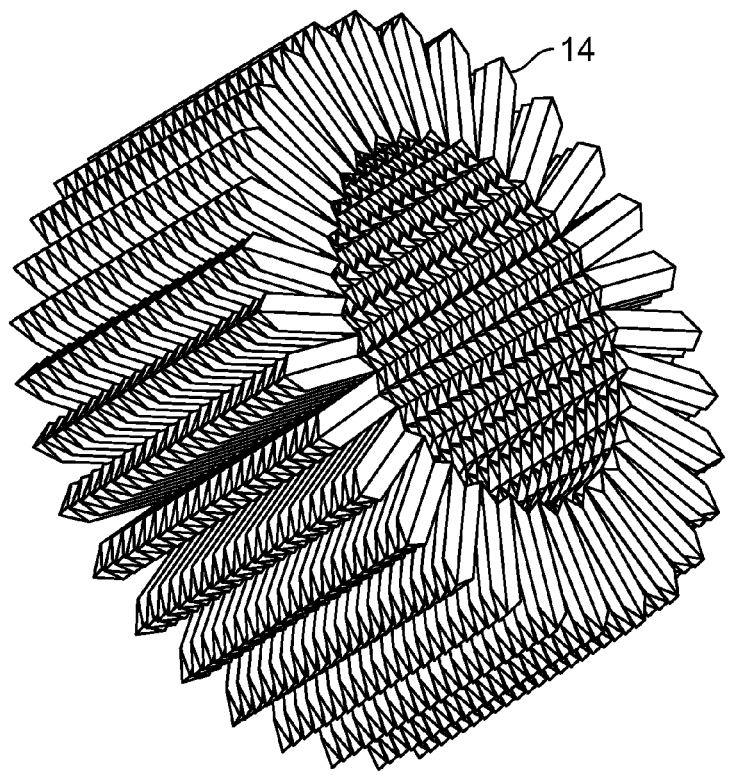
FIG. 7 shows first embodiment of a cylindrical filter element which includes a sheet of filtration medium folded according to the present disclosure, with FIG. 7A showing a perspective, FIG. 7B showing a top view, and FIG. 7C showing a side view.
Figure 7B:
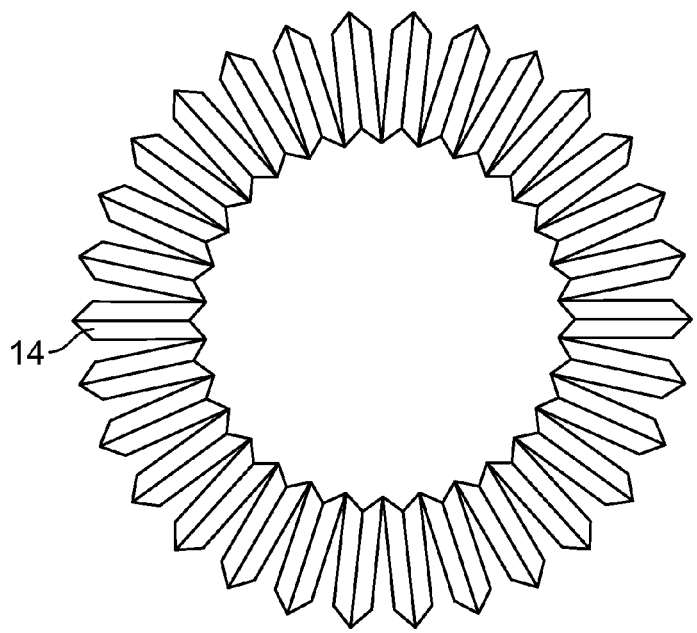
Figure 7C:
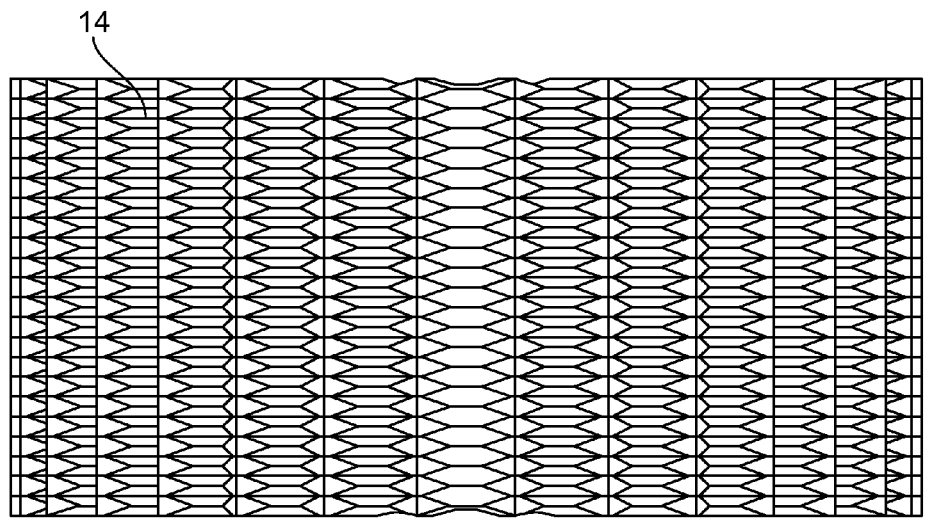

FIGS. 7A-7C show a cylindrical filter element in which a filtration element 14 has been curved to extend around a cylinder axis that is aligned with the X direction (as shown in FIGS. 3 to 5).

Figure 8A:
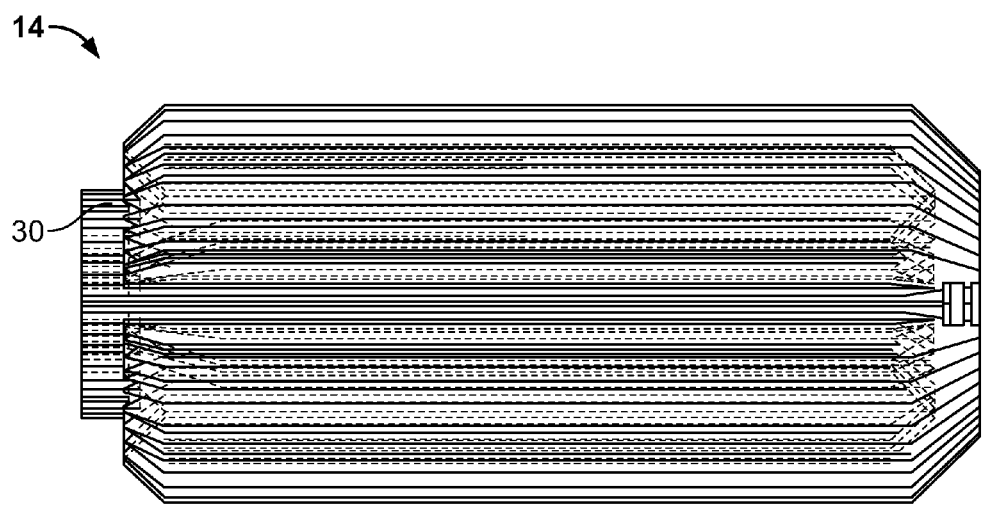
FIG. 8 shows a second embodiment of a cylindrical filter element in the form of a "spin-on" filter element, which includes a sheet of filtration medium folded according to the present disclosure, with FIG. 8A showing a cross-section through the line A-A of FIG. 8C, FIG. 8B showing a side view, and FIG. 8C showing an end view.
Figure 8B:
Figure 8C:
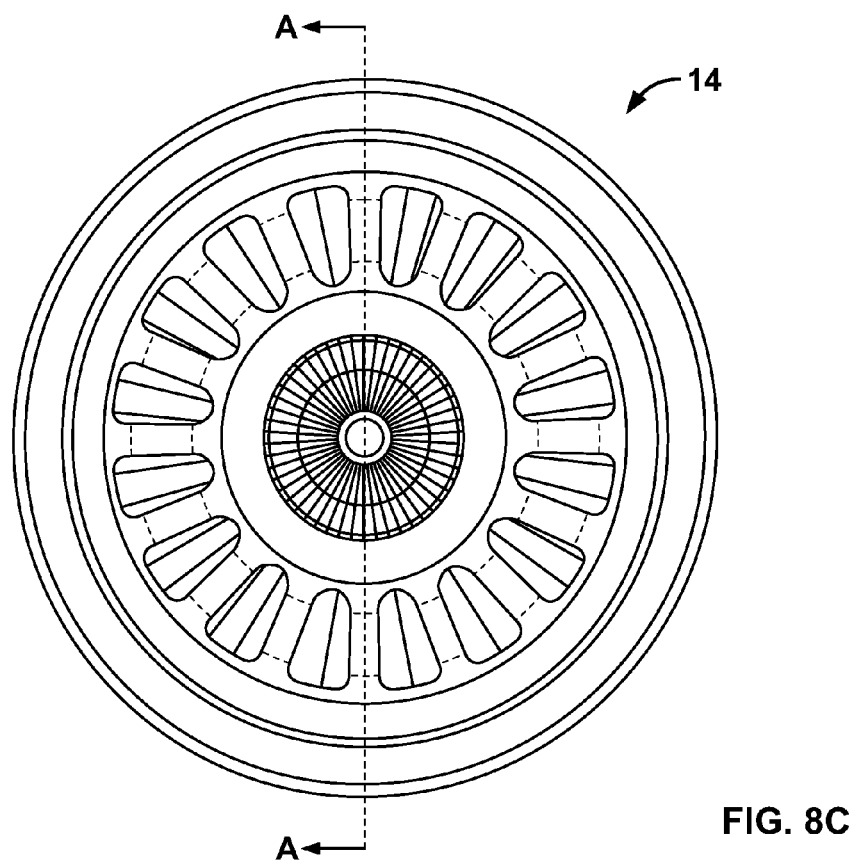
Figure 13:
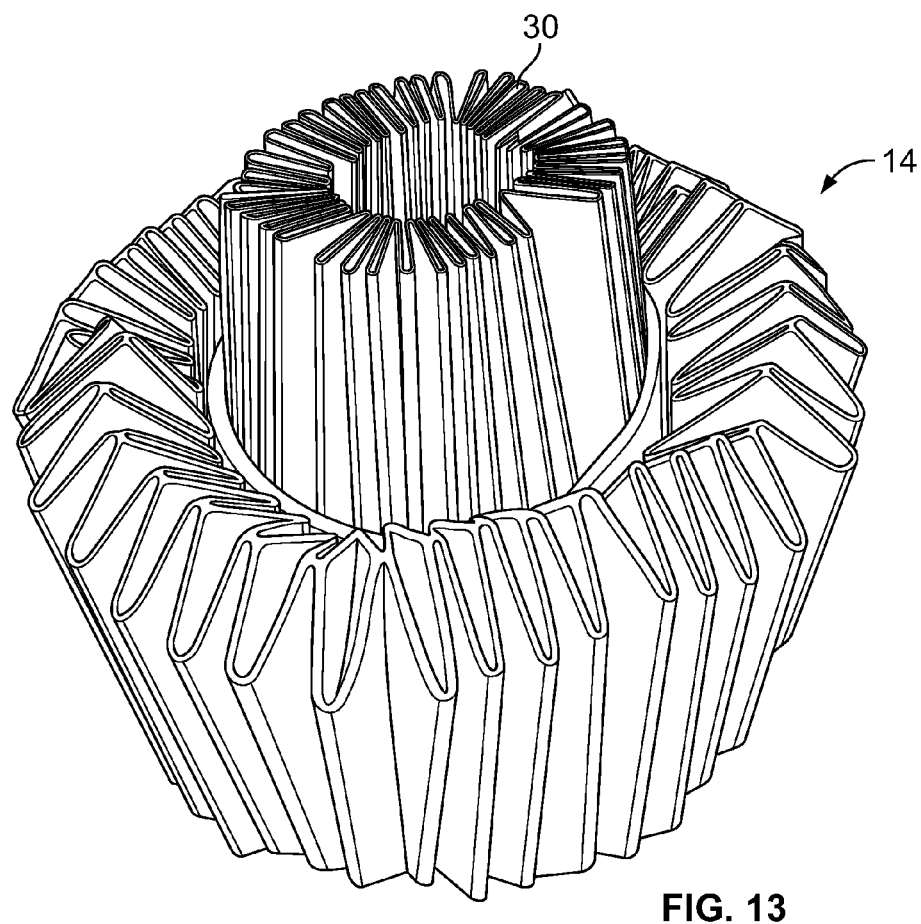
FIG. 13 is a top perspective view of one implementation of the second embodiment of FIGS. 8A-8C.
Figure 14:
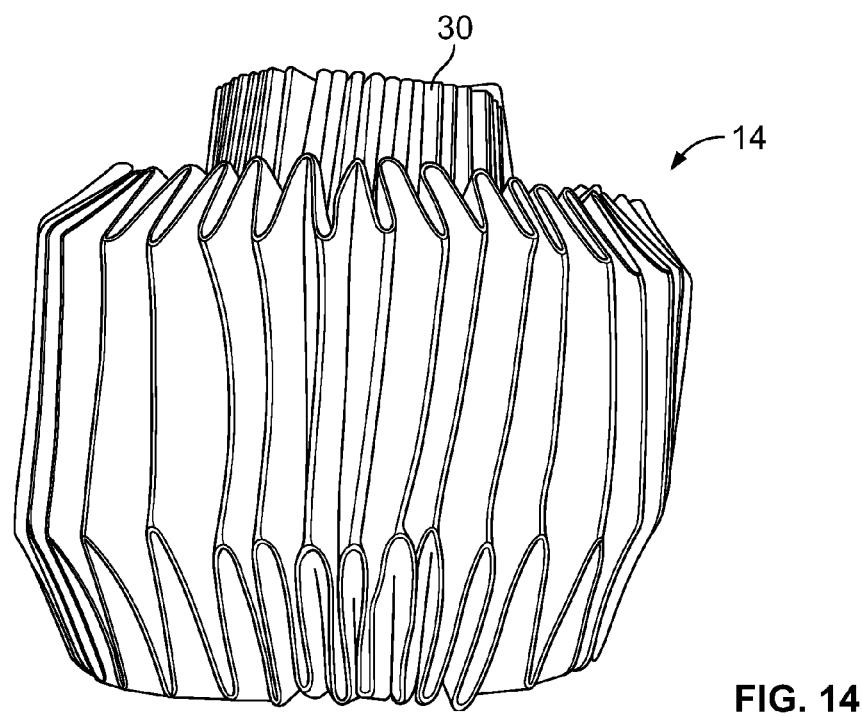
FIG. 14 is a side view of the element of FIG. 13.
Figure 15:
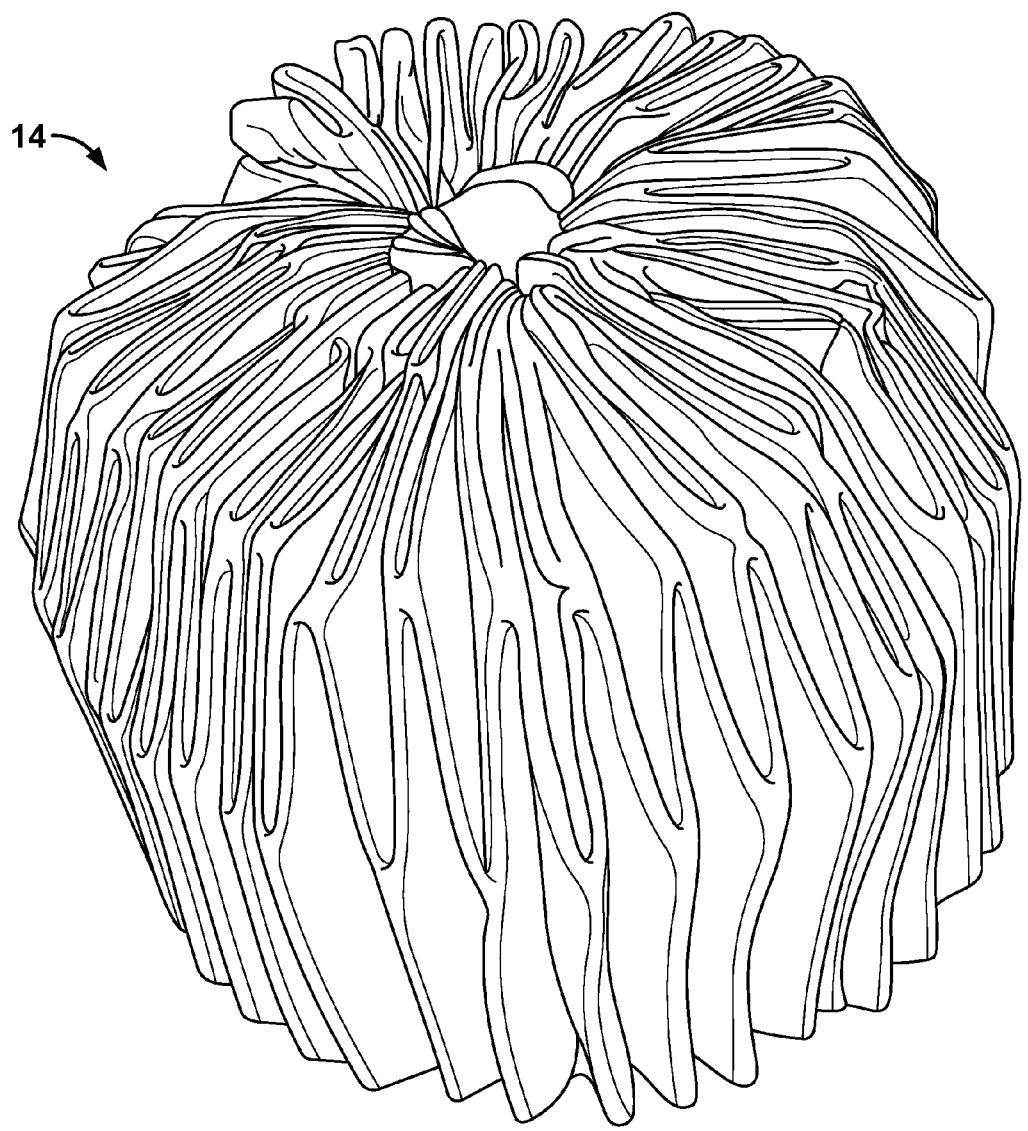
FIG. 15 is a bottom perspective view of the element of FIG. 13.
Figure 17:
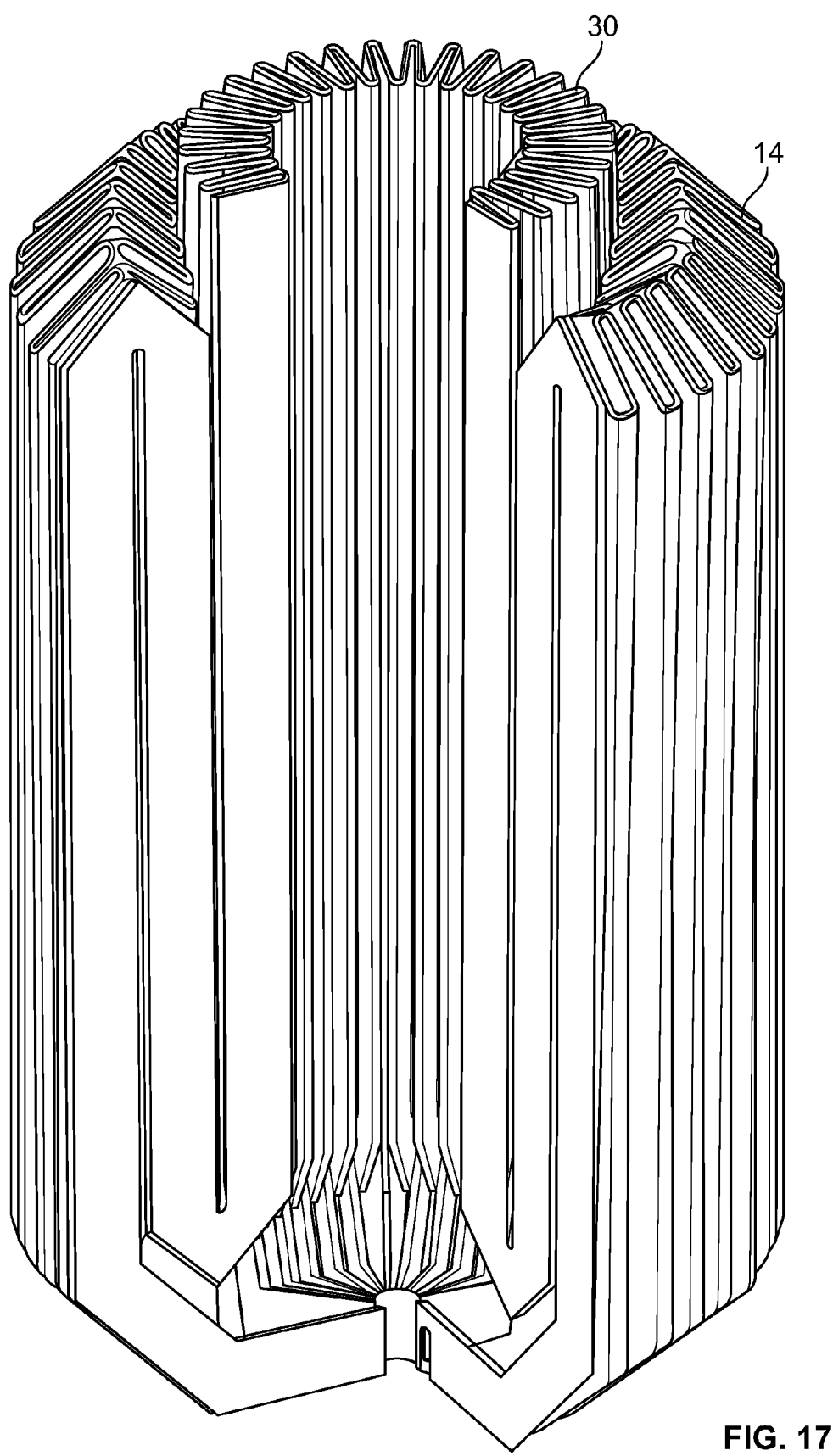
FIG. 17 show a perspective view, with a partial section broken away, of the element of FIGS. 8A-8C and of FIGS. 13-15.

FIGS. 8A-8C shows a cylindrical filter element for "liquid spin-on" applications, in which filtration element 14 has been curved to extend around a cylinder axis that is aligned with the Z direction (as shown in FIGS. 3 to 5). A standard pleated element 30 is depicted in the interior of the element 14. FIG. 13 is a top perspective view of the embodiment of FIGS. 8A-8C. FIG. 14 is a side view of the element of FIG. 13, and FIG. 15 is a bottom perspective view of the element of FIG. 13. Another perspective view, with a partial section broken away, of the element of FIGS. 8A-8C and of FIGS. 13-15 is shown in FIG. 17.

Figure 16:
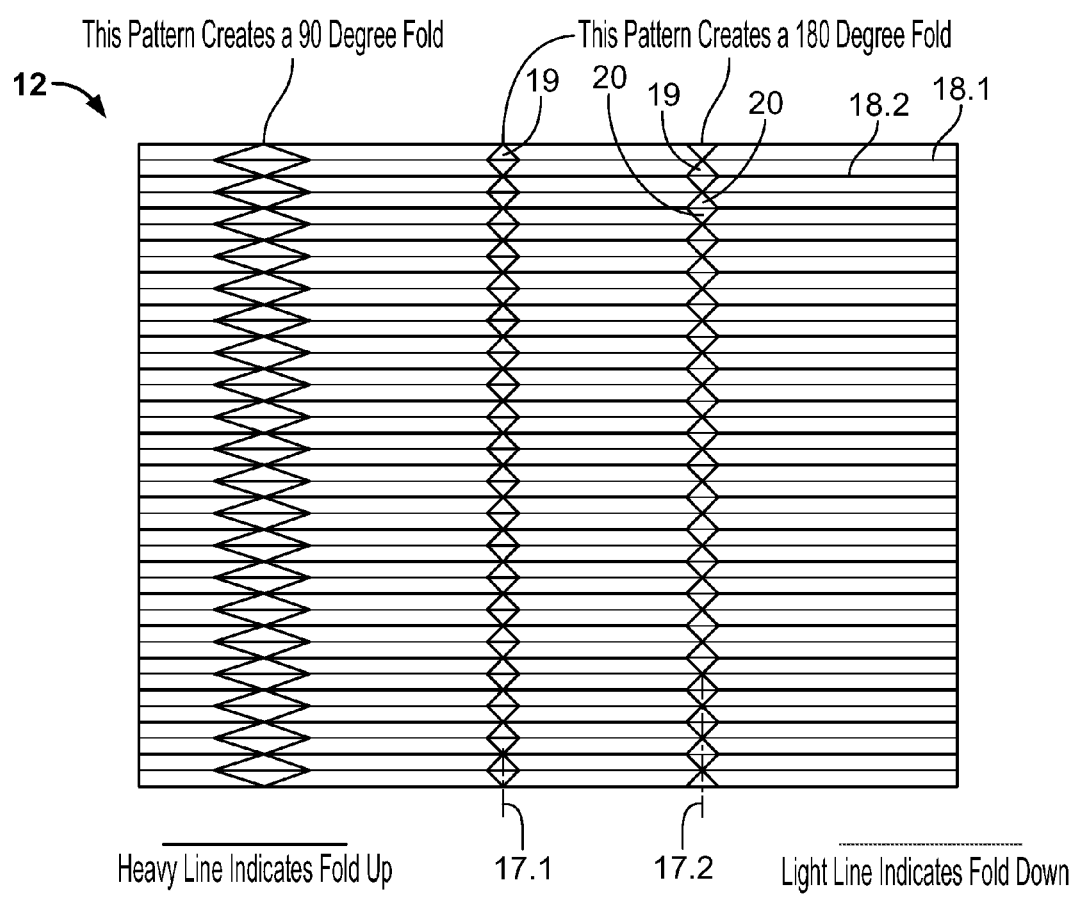
FIG. 16 shows a scoring pattern to be applied to a sheet of filtration medium, that is used to make the filter element of FIGS. 8A-8C and FIGS. 13-15

FIG. 16 shows a scoring pattern to be applied to a sheet of filtration medium that is used to make the filter element of FIGS. 8A-8C, FIGS. 13-15, and FIG. 17. The heavy lines indicate a fold up, while the light lines indicate a fold down.

Figure 9A:
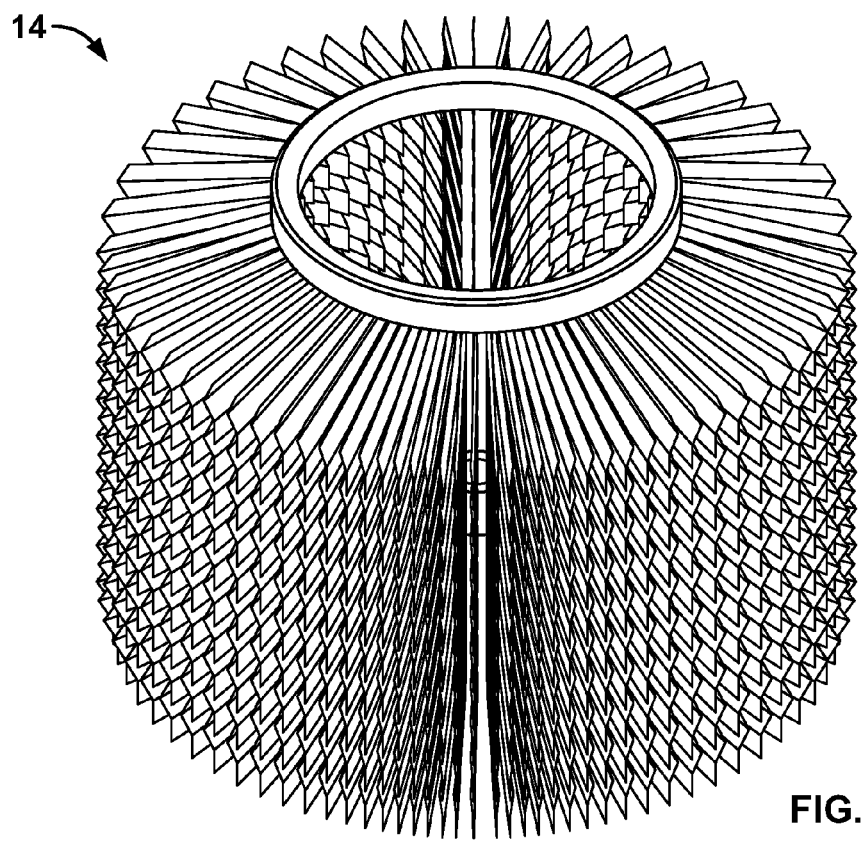
FIG. 9 shows a third embodiment of a cylindrical filter element which includes a sheet of filtration medium folded according to the present disclosure, with FIG. 9A showing a perspective view, FIG. 9B showing a side view, and FIG. 9C showing a top view.
Figure 9B:
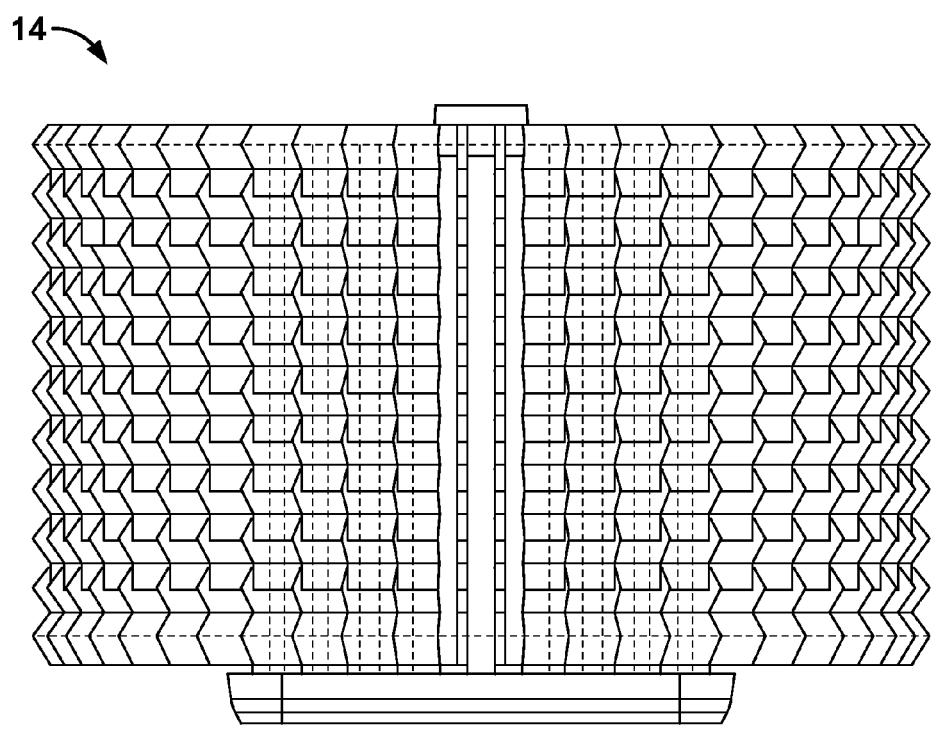
Figure 9C:
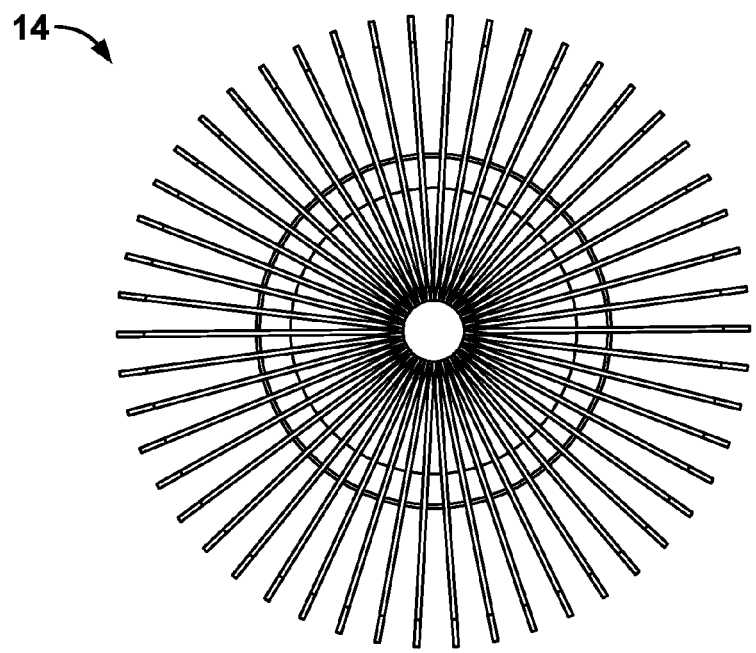
Figure 10A:
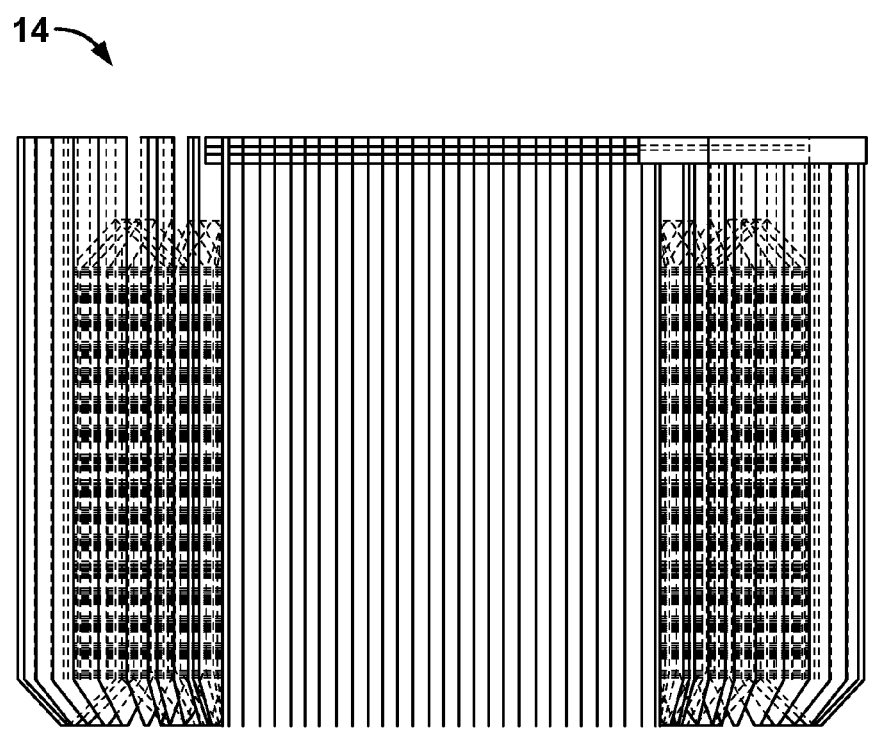
FIG. 10 shows an obround filter element which includes a sheet of filtration medium folded according to the present disclosure, with FIG. 10A showing a cross-section, FIG. 10B showing a perspective, and FIG. 10C showing a top view.
Figure 10B:
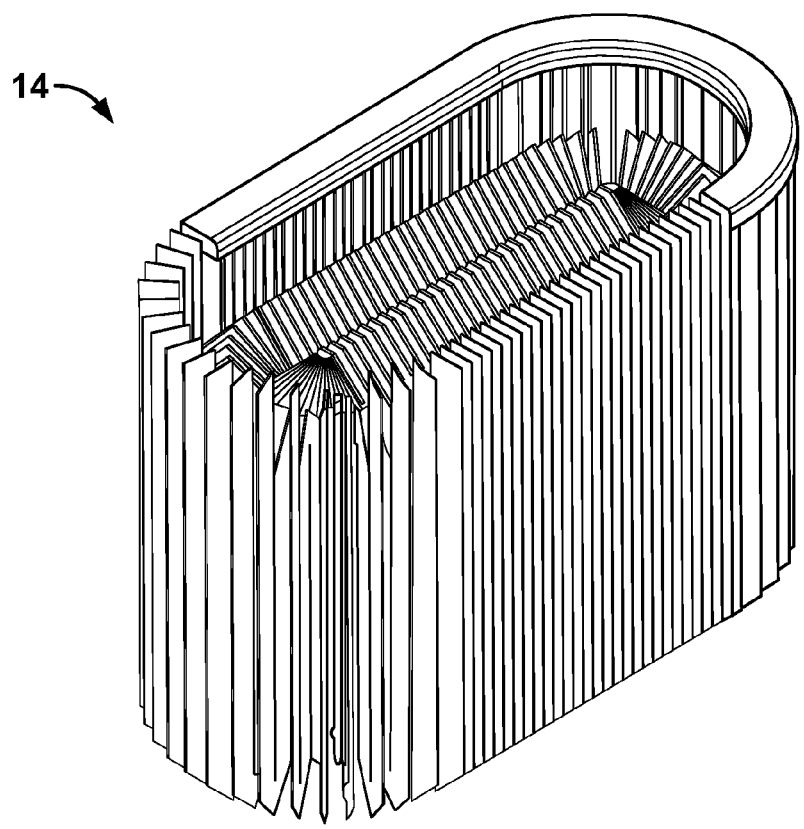
Figure 10C:
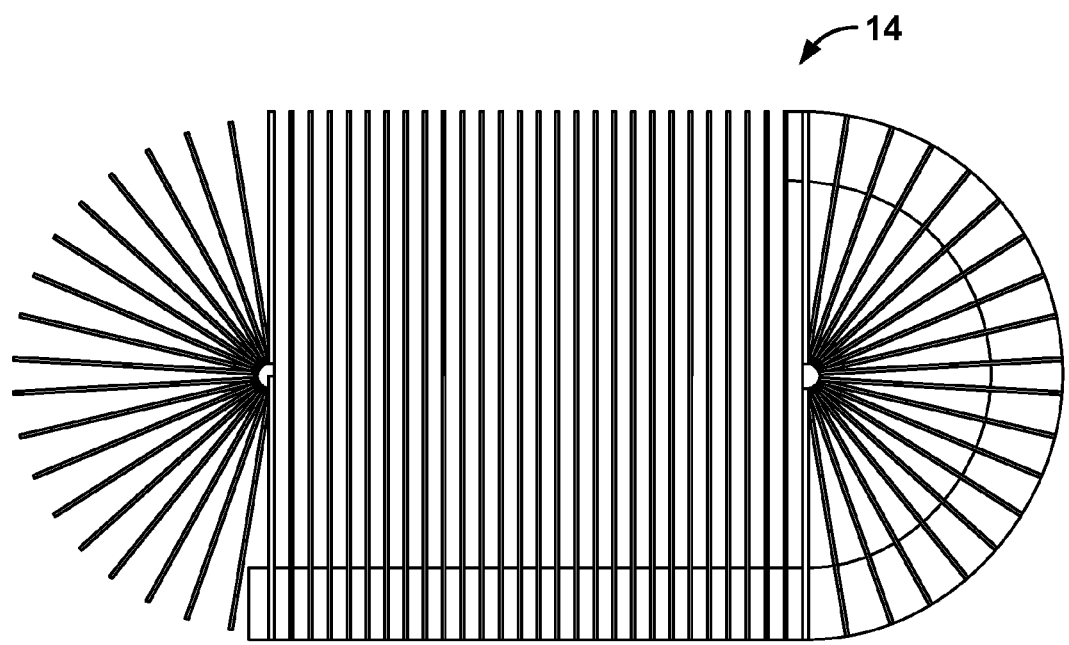
Figure 11A:
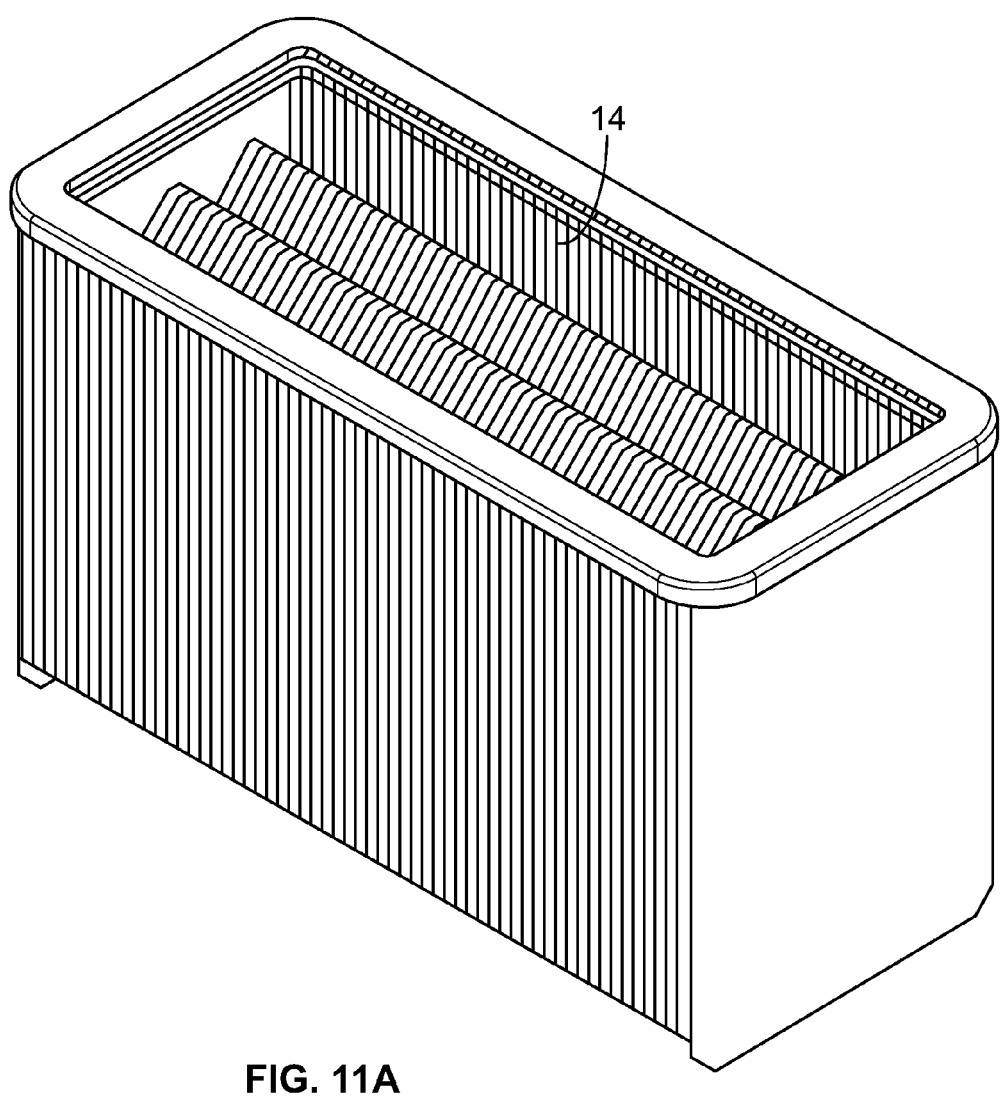
FIG. 11 shows a "rectangular pack" filter element which includes a sheet of filtration medium folded according to the present disclosure, with FIG. 11A showing a perspective view, FIG. 11B showing a side view, and FIG. 11C showing a cross-sectional view.
Figure 11B:
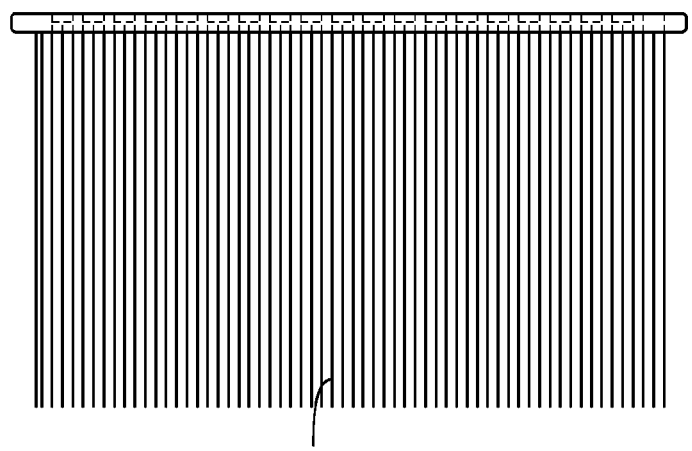
Figure 11C:
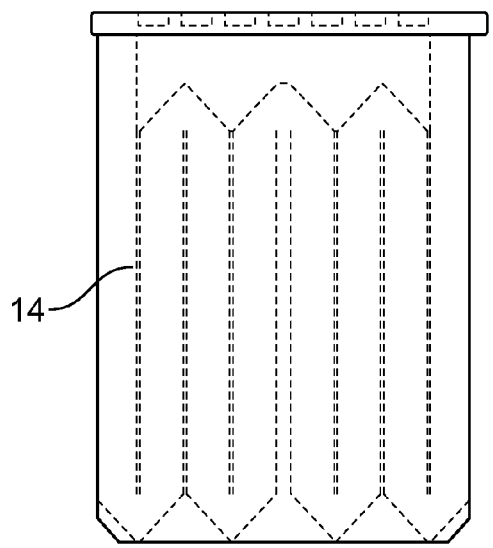

FIGS. 9A-9C shows a cylindrical filter element in which a filtration element 14 has been curved to extend around a cylinder axis that is aligned with the Y direction (as shown in FIGS. 3 to 5). The filter element 14 is also sealed at its ends.

Figure 12A:
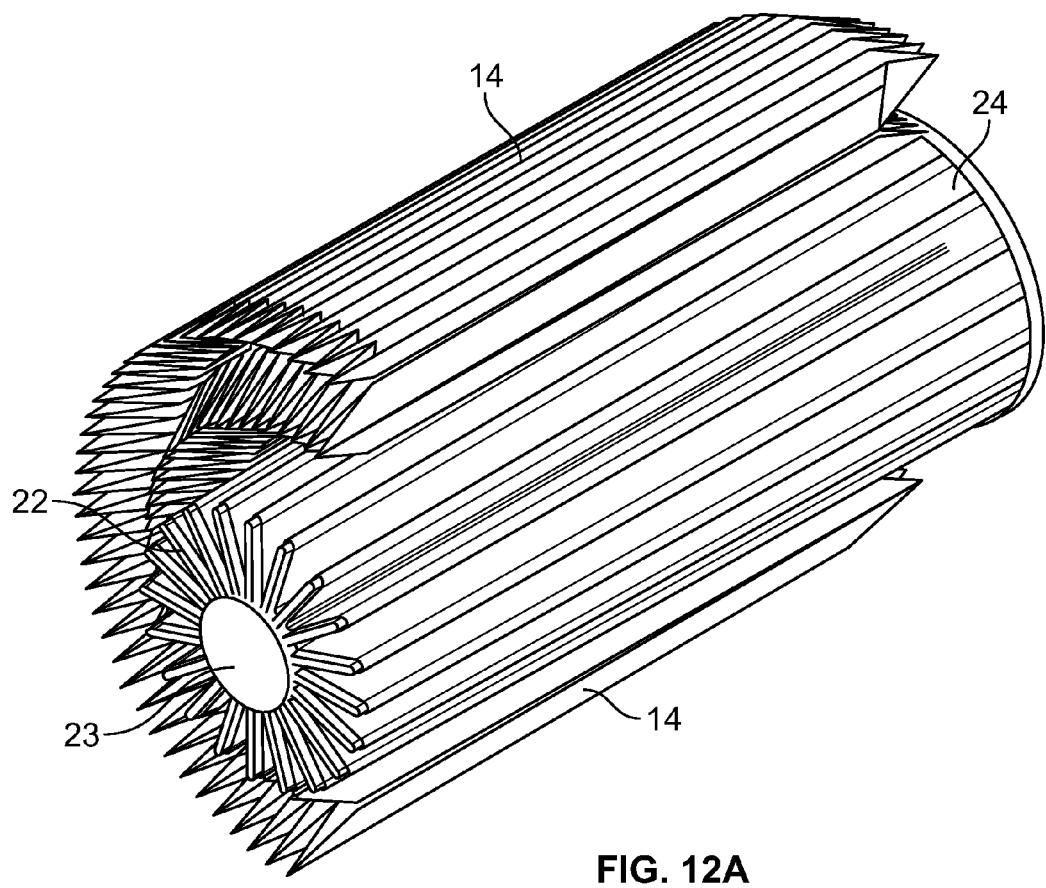
FIG. 12 shows another embodiment of a filter element which includes a sheet of filtration medium folded according to the present disclosure, in combination with conventionally pleated filtration media, with FIG. 12A showing a perspective view, FIG. 12B showing a side view, and FIG. 12C showing an end view.
Figure 12B:
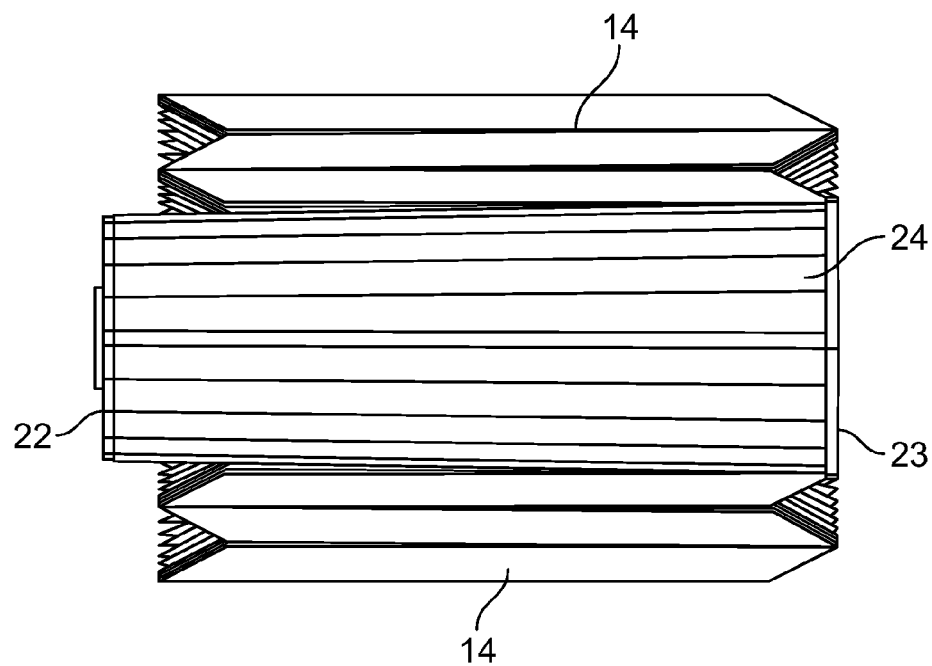
Figure 12C:
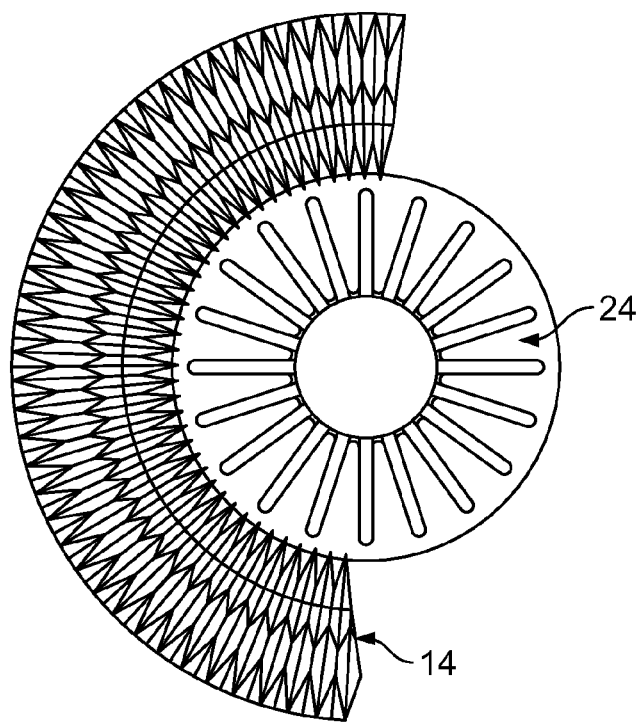

FIGS. 10A-10C and 11A-11C show filter elements 14 in an obround, such as racetrack shape, and a rectangular pack configuration, respectively—each of which is sealed at its one end. Similarly, FIGS. 12A-12C show a cylindrical filter element that is sealed at opposing ends. In filter elements such as the obround element shown in FIG. 10 and the cylindrical element shown in FIG. 12, where the folded pleats 17 need to be fanned out in a radial pattern, the number of major pleats is limited by the minor pleat density that is possible at the inside diameter of the radial formation. (If the minor pleat density gets too high on the inside, the filter media becomes masked.)

As a result, the media density in the outer layers is limited by space (and thus medium density) constraints in the inner layers. This limitation can be offset by filling the inside of the filter element with conventionally pleated filtration media packs 24, in which the pleats are sealed on the inside at one end with hot melt adhesive 22, and sealed and secured to the adjacent outer folded pack at the other end by embedding the packs into an annular polymer end cap 23.

At least some of the embodiments of the present disclosure hold benefits which include:

- The score pattern requires only straight scoring in the Y (machine reel 15) direction, and accordingly, the distance between up and down folds (in the ZX plane), i.e. between major pleats 17, can in theory be infinitely varied by adjusting the fold frequency relative to the Y direction feed speed. This means greatly reduced production set up time and only one set of reciprocating scoring blades for any number of pleat depths. (Additional scoring blades would be required for an angular change in pleat directions, e.g. for the sealed ends shown in FIGS. 9 to 11.)
- The filtration element 14 is very versatile and can be applied to most configurations of current filters, such as cylindrical, conical, panel, staggered panel, V-pack media, oblong/round, z-media, etc.

Depending on application requirements for axial or radial strength, it is envisaged that cylindrical filters using this pleating method could be configured with pleats arranged in any of three ways, with the cylindrical axis being aligned with the X, Z or Y direction as shown in FIGS. 7 to 9.

Conical filters can be configured in two of these arrangements.

In liquid spin-on applications, e.g. the filtration element shown in FIG. 8, the shape of the media pack allows almost the entire internal volume of the canister to be utilized for filter media.

Referring to the filtration element 14 shown in FIGS. 3 to 5, the flexibility in the X and Y directions allow for a wide variation in pleat densities in relation to size, with the same machine output.

The filtration element 14 is resistant to crushing and collapsing.

Consecutive media layers need not be attached together with adhesive—which saves on material and manufacturing operations and costs, and also increases effective filtering area.

Compared to other construction methods, a greater proportion of the filtration medium used in the filter will function as filter medium. It is envisaged that significant cost savings can be achieved by reducing the material needed for support and/or sealing components such as liners, end caps and seals.

For many of the envisaged configurations of filter elements, the fluid flow path can be optimized, leading to lower pressure drop.

When compared to conventional pleated media arrangements, the inherent stiffness provided by the minor pleat geometry will minimize masking of the media.

In many of the envisaged configurations, it is believed that this construction method will provide better performance in terms of pressure drop and contaminant capacity than the equivalent conventional pleated or z-media.

Most filter configurations can be manufactured in rectangular or segmented modules or filtration elements 14, to take advantage of economies of scale, and limit the size of processing equipment.

Figure 18:
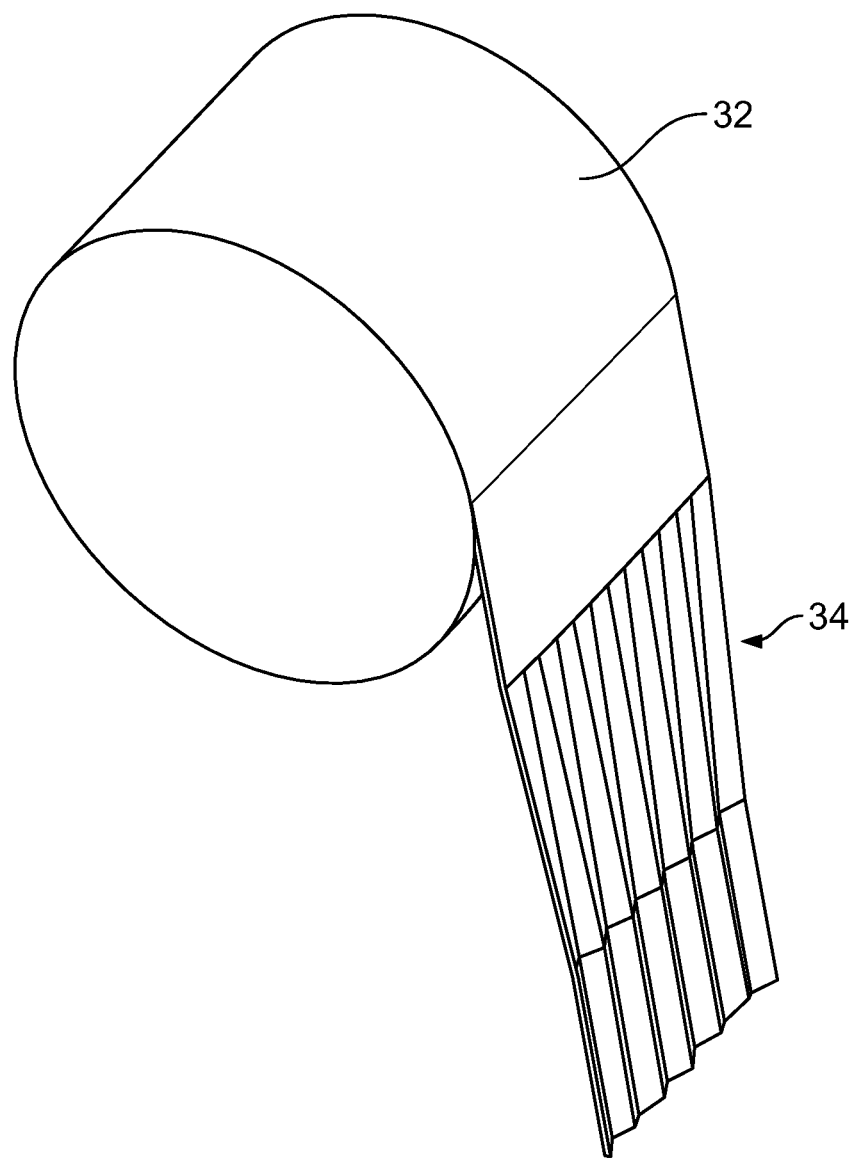
FIG. 18 is a perspective view of a roll of media during one step of making the filtration sheets of FIGS. 1, 2, and 16, but before a step of scoring.

FIG. 18 is a perspective view of a roll of media 32 during one step of making the filtration sheets of FIGS. 1, 2, and 16, but before a step of scoring. The media 32 has pleats folded at section 34, typically by a pleating machine. After the pleats are formed in section 34, the media at section 34 is scored.

Figure 19:
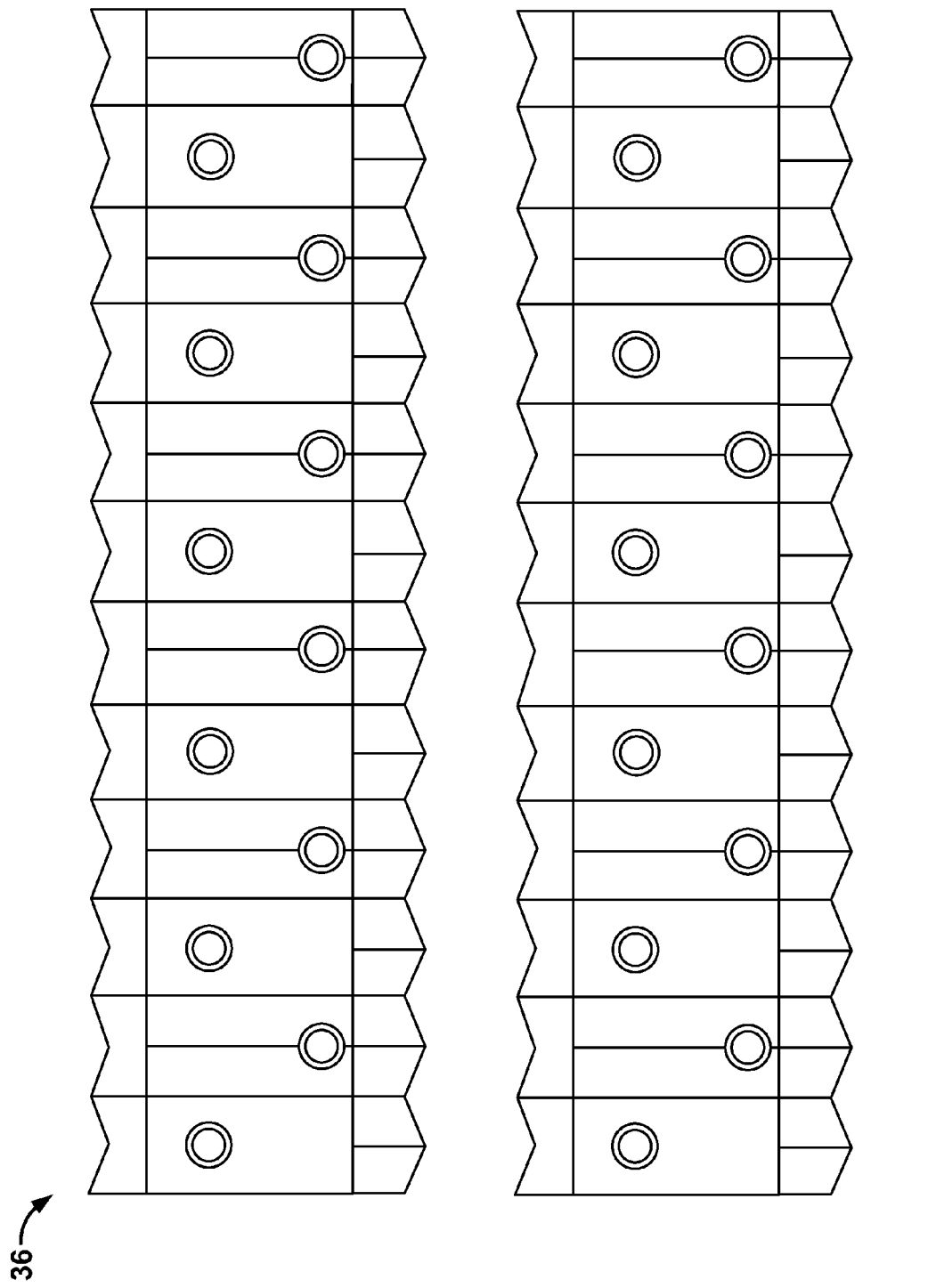
FIG. 19 is a front view of a reciprocating scoring device used on the media to make the filtration sheets of FIGS. 1, 2, and 16.
Figure 20:
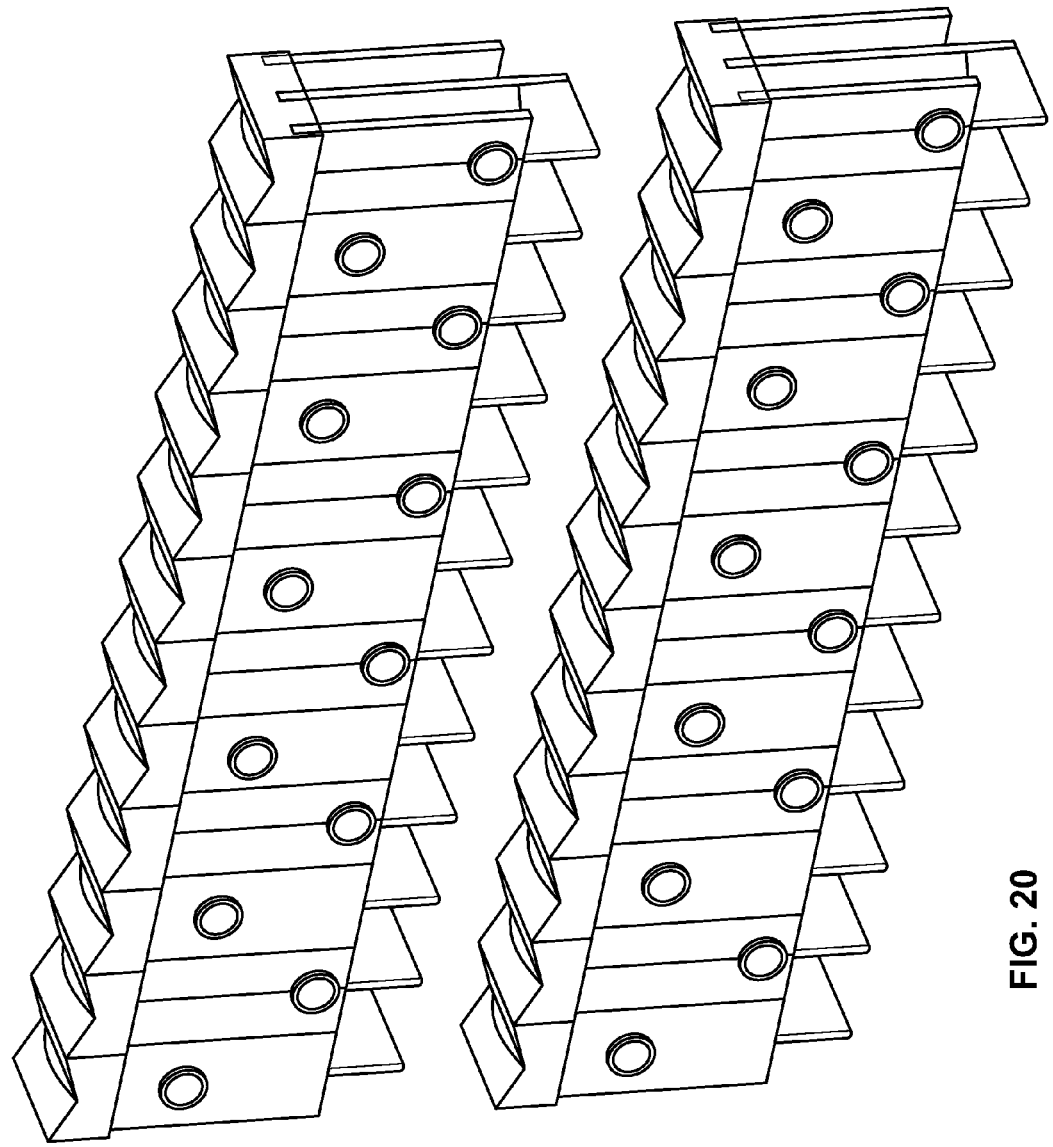
FIG. 20 is a perspective view of the scoring device of FIG. 19.
Figure 21:
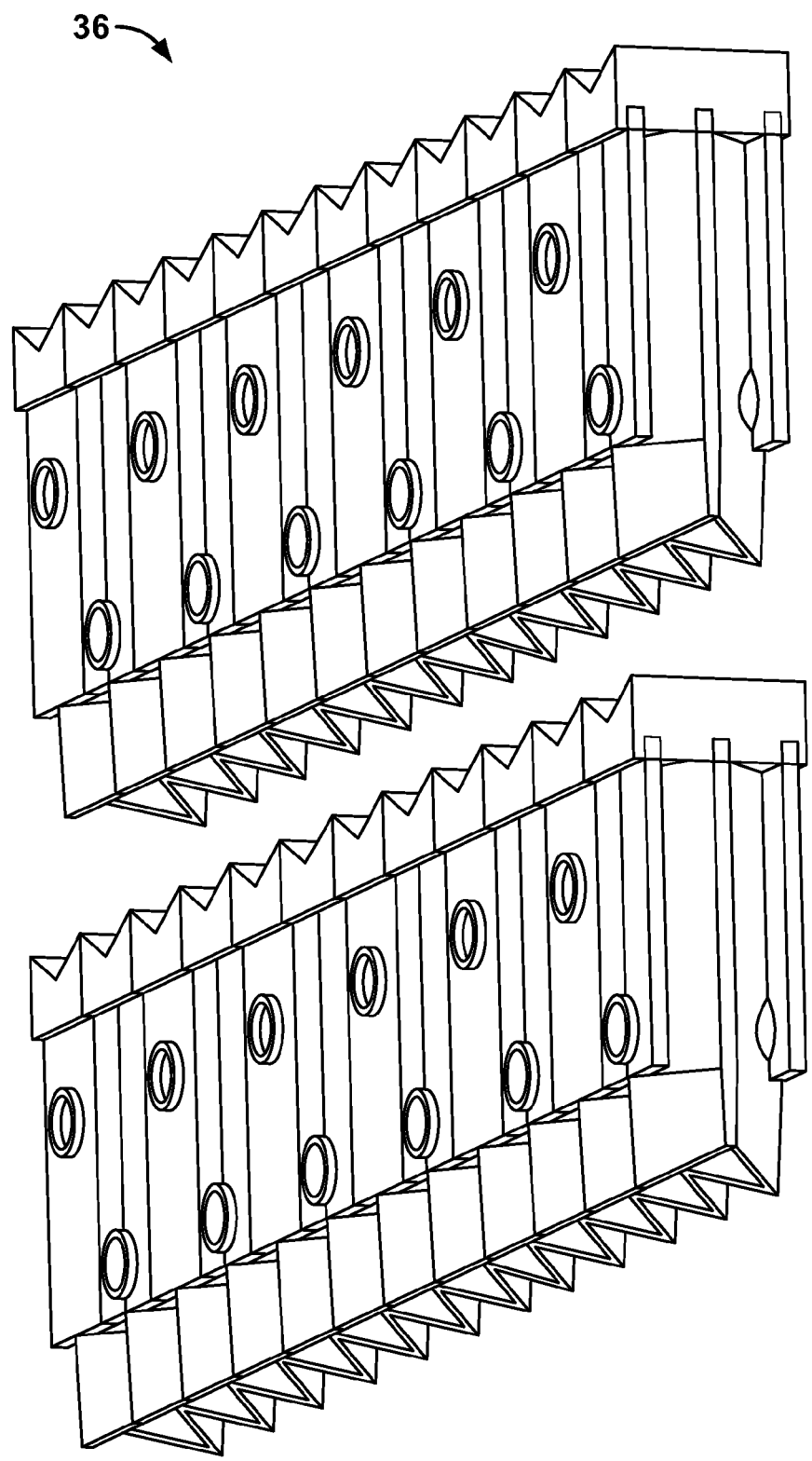
FIG. 21 is another perspective view of the scoring device of FIG. 19.

FIGS. 19-21 show views of an example embodiment of a reciprocating scoring device 36 used on the media 32 to make the filtration sheets of FIGS. 1, 2, and 16. The scores are formed by the scoring device 36 after the pleats are formed, as depicted in FIG. 18.

B. FIGS. 22-34

In general, it has been learned that the pressure drop across a filter element is related to the diameter of the outlet of the clean fluid exit hole, when you have filter elements that filter from outside to inside. It has been observed that the performance gains in a filter element rise (performance gains being defined by a decrease in pressure drop), as a ratio of the pleat depth to the diameter of the air outlet increases. It has further been observed that to achieve a longer filter life, more filter media is used, but as more filter media is used by way of increasing the pleat depth, the outlet hole becomes smaller. However, it has also been observed that to get better performance, as measured by less of a pressure drop, one wants to make the outlet size larger.

Figure 22:
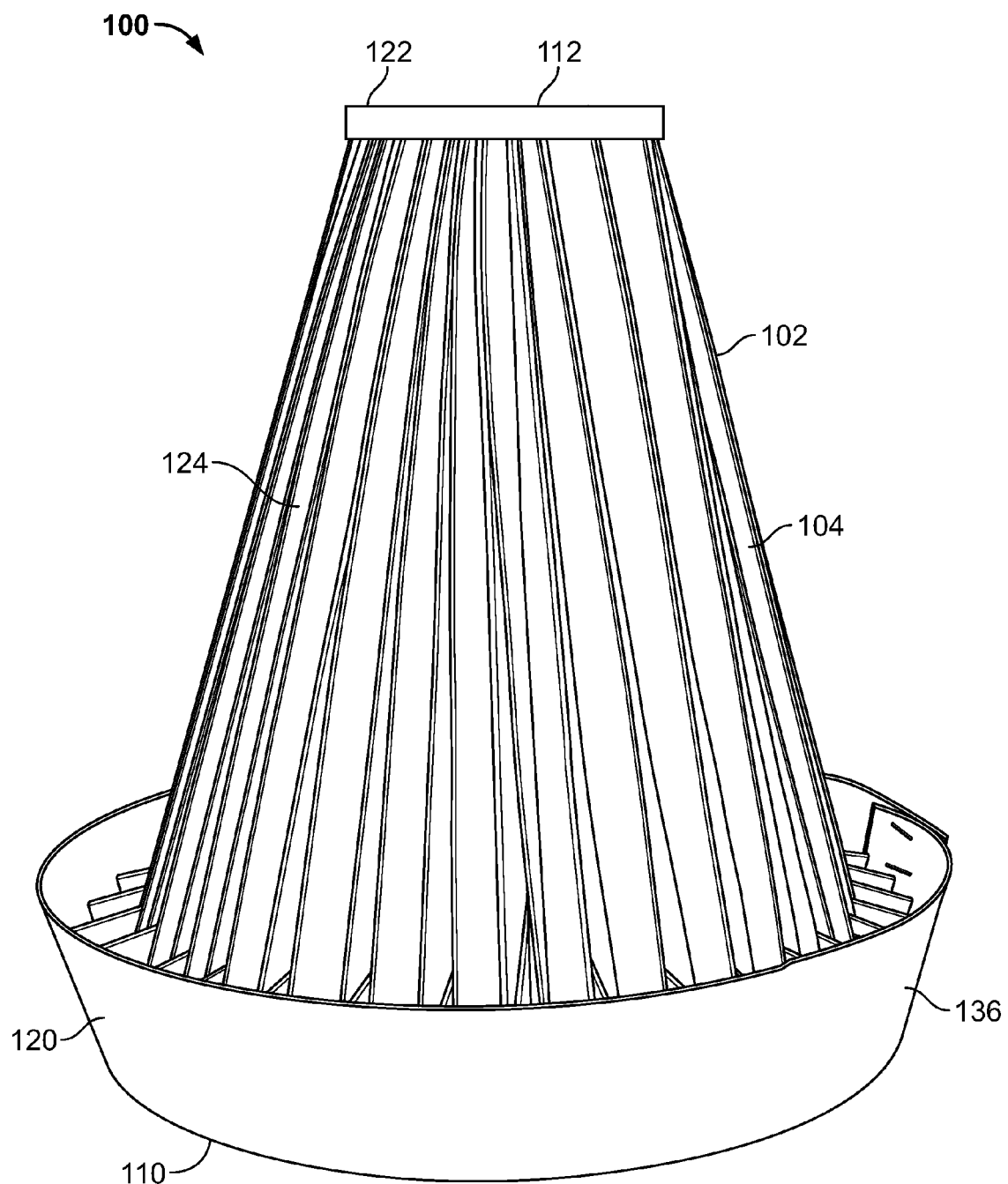
FIG. 22 is a side view of one example filter element, constructed in accordance with principles of this disclosure.
Figure 34:
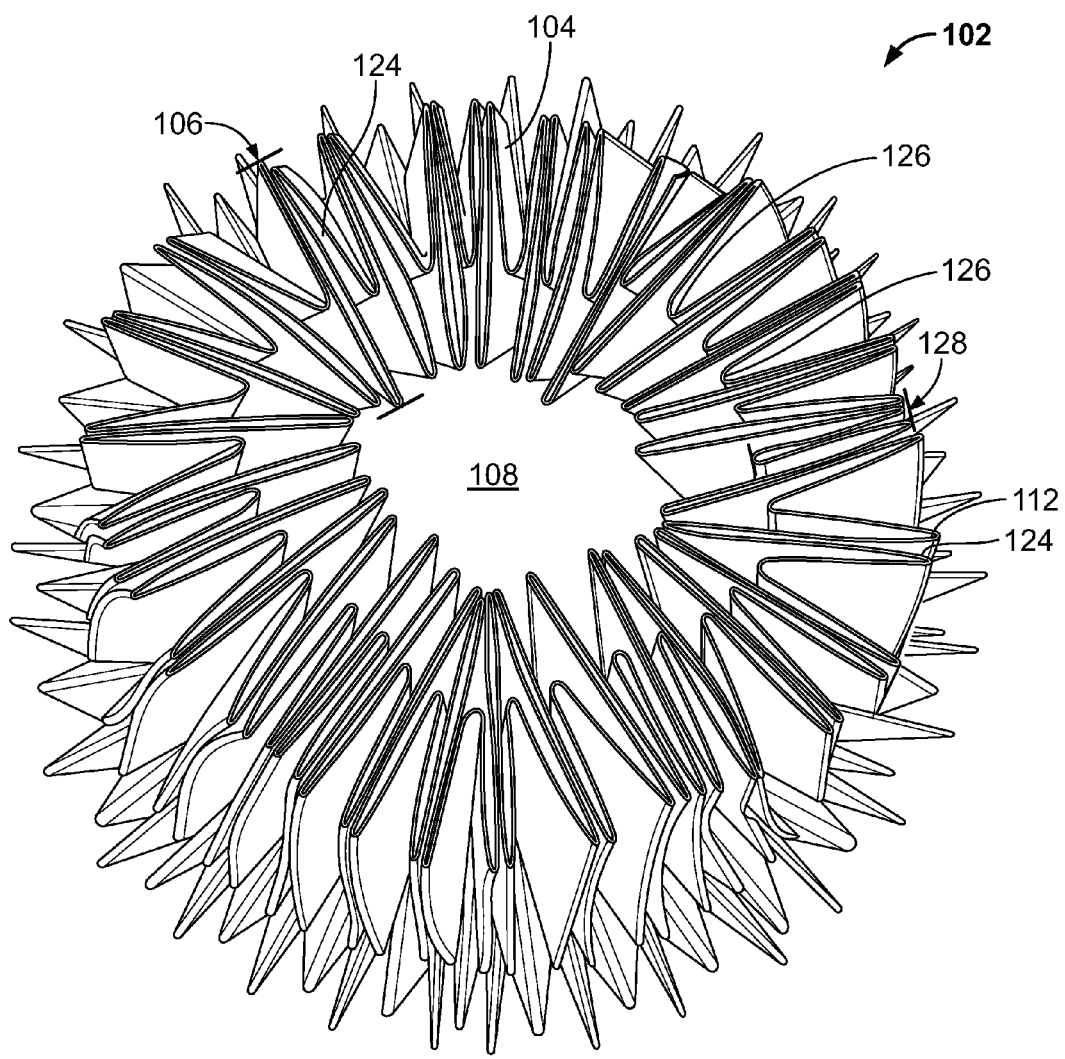
FIG. 34 is a top view of the media pack of FIG. 31.

In applying these principles, one example filter element 100 shown in FIG. 22 has been developed. The filter element 100 includes a pleated media pack 102. The pleated media pack 102 includes a section of filtration media folded into pleats 104. At least some of the pleats 104 have a major pleat depth 106 (FIG. 34).

Figure 23:
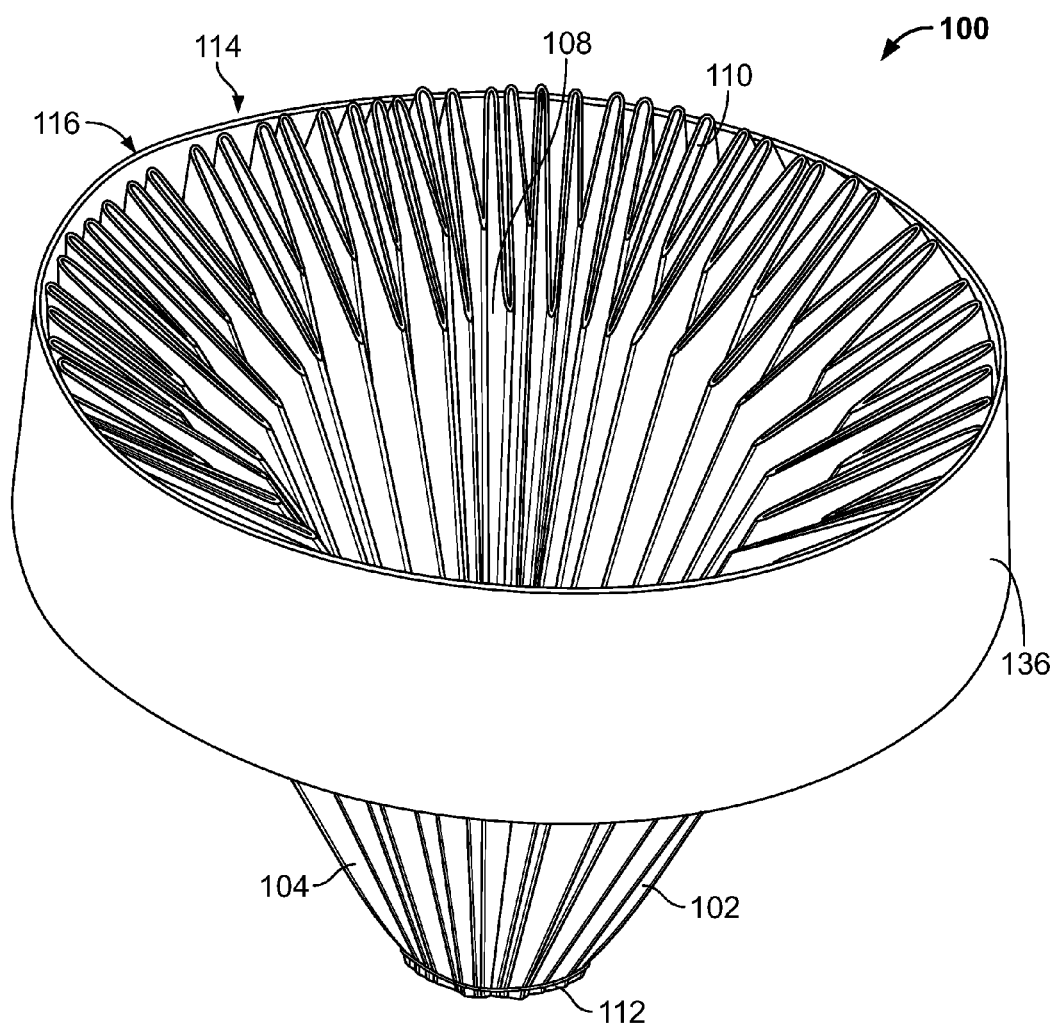
FIG. 23 is a bottom perspective view of the element of FIG. 22.

The section of filtration media of the pleated media pack 102 can be configured into a tube defining an interior volume 108 (FIG. 23). The pleated media pack 102 defines a first end 110 and an opposite second end 112.

The interior volume 108 of the tube is shown as have a circular cross-section, but can have a variety of cross-sectional shapes including oval or racetrack. In the embodiment depicted, the interior volume 108 is conical in shape. In other embodiments, the interior volume 108 can be cylindrical in shape.

In FIG. 23, it can be seen how at the first end 110 is an opening 114 providing access to the interior volume 108. The opening 114 will act as the outlet opening 116 for the element 100. That is, fluid to be filtered will enter the element 100 from outside of the pleated media pack 102, pass through the pleats 104 and then into the interior volume 108. From the interior volume 108, the filtered fluid will exit through the outlet opening 116. In references herein to the "diameter" of the opening 114, it refers to an outer diameter, if the opening 114 is generally circular. When not circular, the appropriate dimension is used.

As mentioned above, it has been learned that as the ratio of the major pleat depth 106 to the dimension, such as outer diameter (if circular; in other shapes, the appropriate dimension is used) of the outlet opening 116 increases, performance gains of the preferred embodiment as compared to a typical prior art cylindrical element rise, which means the pressure drop decreases. It has been found that a ratio of the major pleat depth to the outer dimension, such as diameter, should be greater than 0.2 to achieve both performance and life advantages.

In many implementations, it has been found that the ratio of major pleat depth to outlet dimension (such as diameter) should not exceed 0.5. When exceeding 0.5, in some filtering conditions, it can result in bunched up pleats.

In general, it has been learned that a ratio of pleat depth to outlet dimension, such as diameter, of between 0.2-0.35 achieves most benefits of better performance, as measured by the pressure drop.

In the element 100 shown in FIG. 22, a first end 110 is secured to a first end cap 120, depicted schematically in the FIGS. The first end cap 120 seals the pleats 104 to prevent bypass of filter flow. More details on the first end cap 120 are described further below. At the second end 112 is a second end cap 122. The second end cap 122 is secured to the pleats 104 to close the ends. The second end cap 122 can either be a closed end cap or an open end cap.

In example embodiments, the pleats 104 include major pleats 124 defining the major pleat depth 106.

It has been observed that as the pleat depth 106 increases, the pleat spacing along the outside of the element also increases for a given pleat spacing at the inside diameter. It has been observed that the spacing around the outside of the element does not need to be so widely spaced, so the addition of the minor pleats 126 improves performance by adding more media to the element 100.

The pleats 104, in example embodiment illustrated, includes minor pleats 126. The minor pleats 126 have a minor pleat depth 128 (FIG. 34) that is less than the major pleat depth 106.

Various embodiments can be made. In the example embodiment shown in FIGS. 31-34, the major pleats 124 and the minor pleats 126 alternate with each other.

Figure 24:
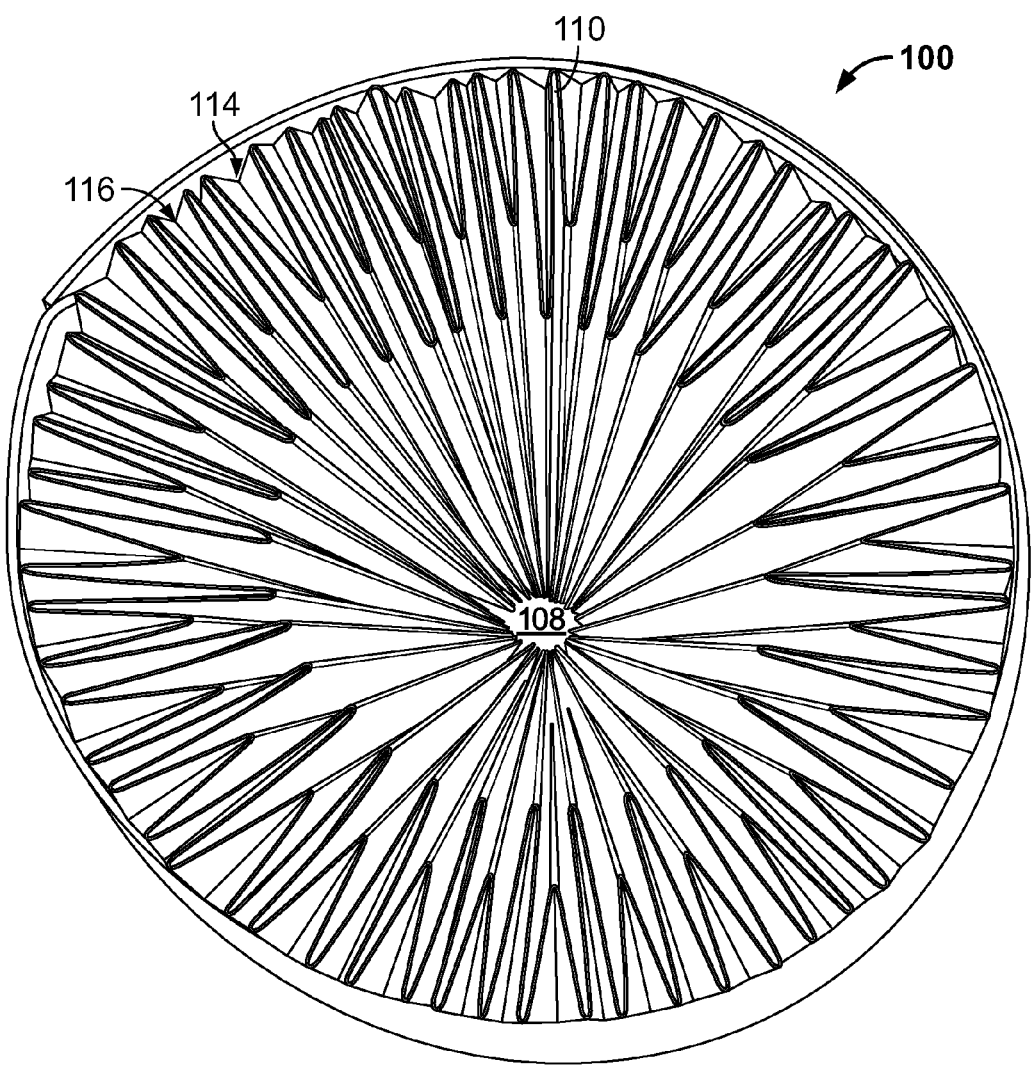
FIG. 24 is an end view of the bottom of the element of FIG. 22.
Figure 25:
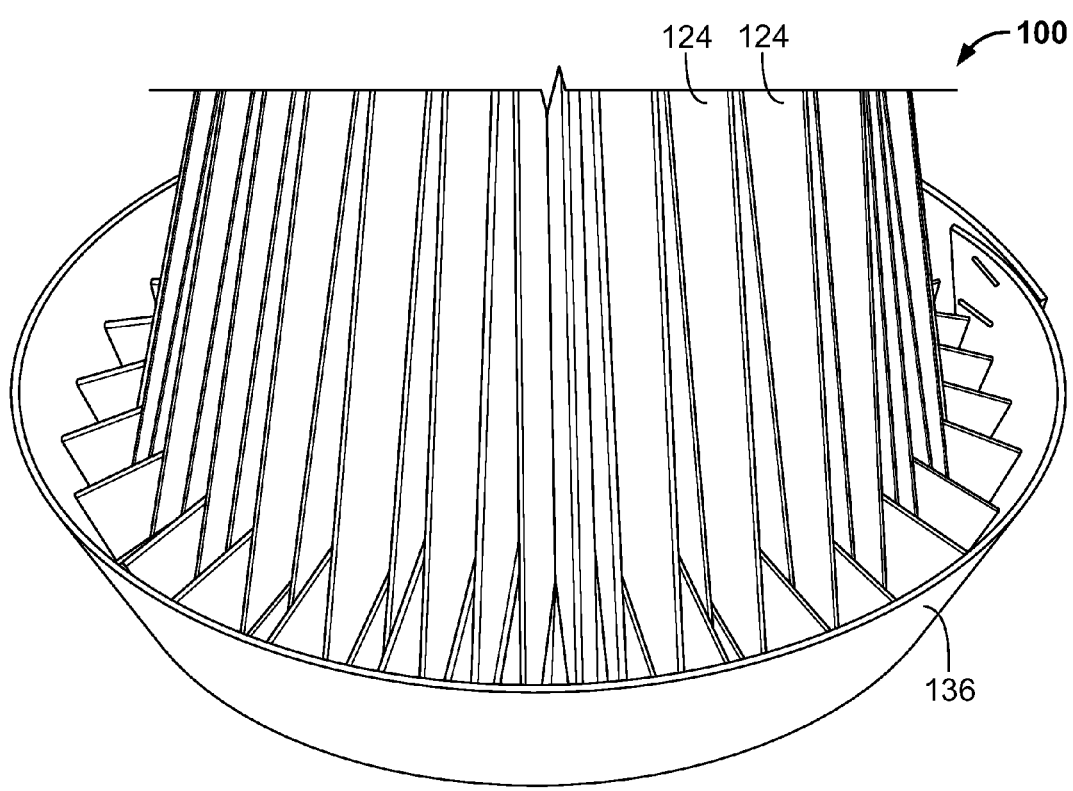
FIG. 25 is a close-up, perspective view of the bottom end of the element of FIG. 22.

Attention is directed to FIGS. 31-34. The pleated media pack 102 is illustrated before being formed into the element 100 having end caps 120, 122. In the example embodiment shown, the pleated media pack 102 is configured to increase size of the fluid flow outlet, being formed at the opening 114 (FIGS. 23 and 24), which results in performance improvement (less pressure drop across the media pack 102). For example, to increase the size of the opening 114, at least some of the pleats 104 at the first end 110 are inverted an opposite direction of the remaining portion, or rest, of the pleat 104. The inverted section 132 extends from the first end 110 along at least a portion of the pleat length from the first end 110 to the second end 112.

In the example illustrated, the inverted section 132 extends from the first end 110 not greater than 50% of the length to the second end 112. In some implementations, the inverted section 132 extends from the first end 110 at least 5% of the length to the second end 112. In some implementations, the inverted section 132 extends from the first end 110 between 10%-30% of the length to the second end 112.

Figure 31:
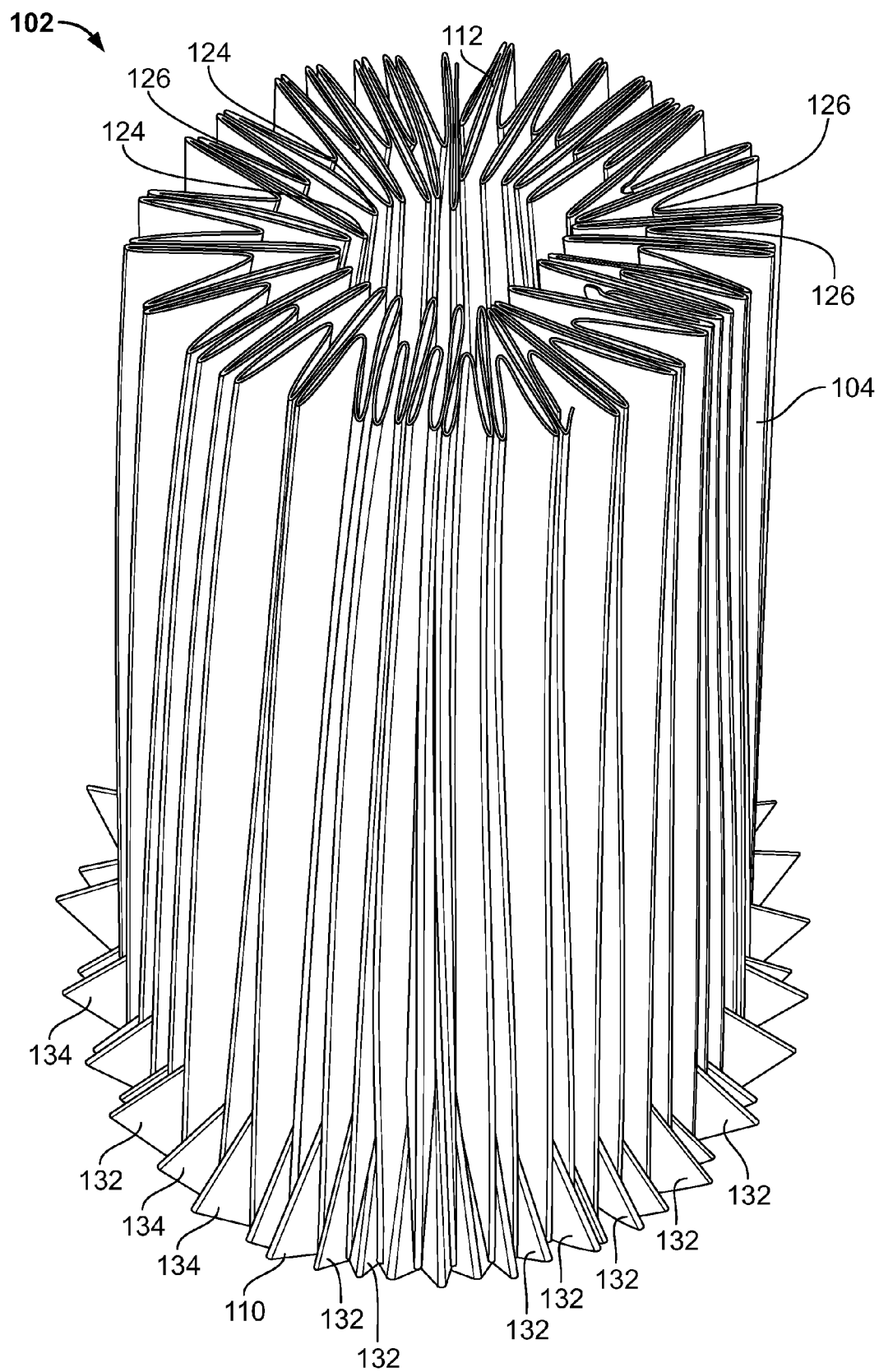
FIG. 31 is a top perspective view of the media pack formed from the media sheets of FIGS. 28-30 during one step of being made into the element of FIGS. 22-25.
Figure 32:
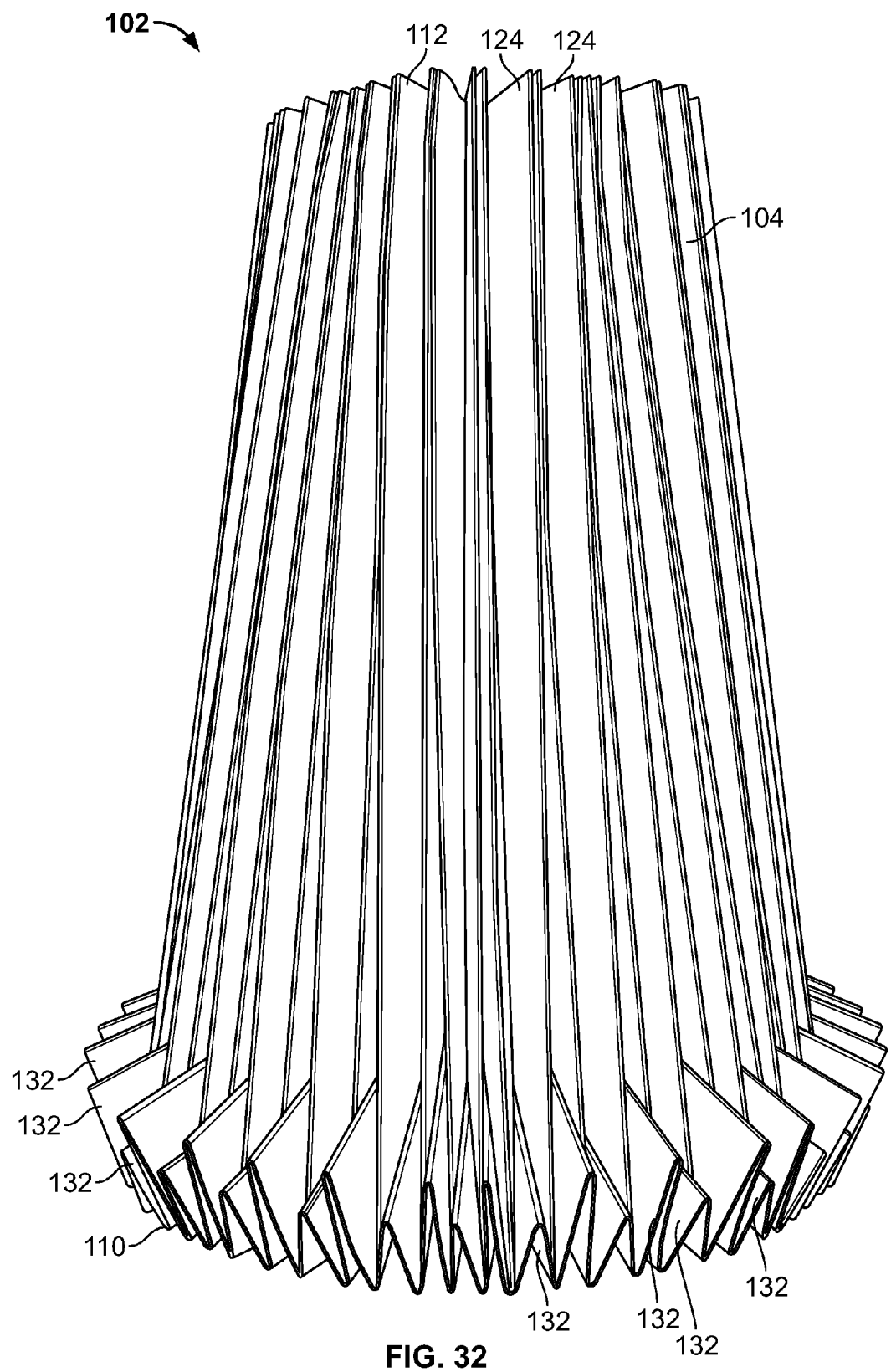
FIG. 32 is a side view of the media pack of FIG. 31.
Figure 33:
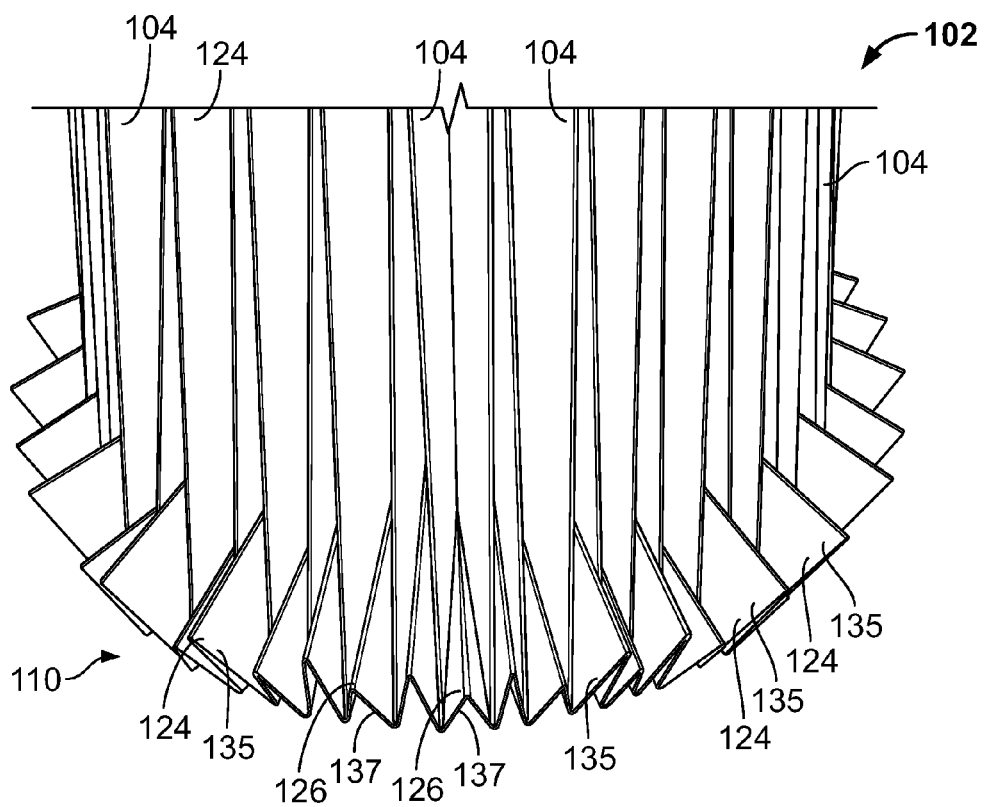
FIG. 33 is a close-up perspective view of the bottom end of the media pack of FIG. 31.

As can be seen in FIG. 31, the inverted sections 132 appear as triangular extensions 134 of media projecting from a remaining portion of the pleated media pack 102.

In some embodiments, at least some of the major pleats 124 at the first end 110 are inverted at section 135 (FIG. 33) in an opposite direction of the rest of the pleat 104.

In some embodiments, at least some of the minor pleats 126 at the first end 110 are inverted at section 137 (FIG. 33) an opposite direction of the rest of the pleat 104.

In some embodiments, at least some of both the major pleats 124 and minor pleats 126 at the first end 110 are inverted at sections 135, 137, respectively, in an opposite direction of the rest of the pleat 104, along at least a portion of the pleat length from the first end 110 toward the second end 112.

In some embodiments, all of the major pleats 124 and minor pleats 126 at the first end 110 are inverted an opposite direction of the rest of the pleat 104, along at least a portion of the pleat length from the first end 110 toward the second end 112.

In many embodiments, in general, the second end 112 preferably will not include inverted sections 132, but will be the normal pleat folded direction.

As can be seen in FIG. 22, in general, an outer profile shape of the media pack 102 can be generally conical, with an inner diameter at the first end 110 being greater than an inner diameter at the second end 112. In other embodiments, the outer profile shape of the media pack 102 can be generally cylindrical, in which the inner diameter at the first end 110 is general equal to the inner diameter at the second end 112.

Attention is again directed to FIGS. 22-24. The first end cap 120 is shown schematically, and schematically represents a section of a potting compound 136, or urethane material, that can be used to seal the media pack 102 along the radial outer periphery of the pleated media pack 102. This includes the inverted sections 132 of the pleats 104. The first end cap 120 can be made by using a centrifugal control for the potting compound 136. The centrifugal control to apply the potting compound 136 results in at least two benefits. The first benefit is that not as much potting compound 136 is needed, as compared to processes that use a free rise molding technique. The second benefit is that not as much filter media is masked through the centrifugal control, as compared to molding in a free rise molding process.

FIGS. 26-30 illustrate a media sheet 140 before it is formed into the pleated media pack 102.

Figure 26:
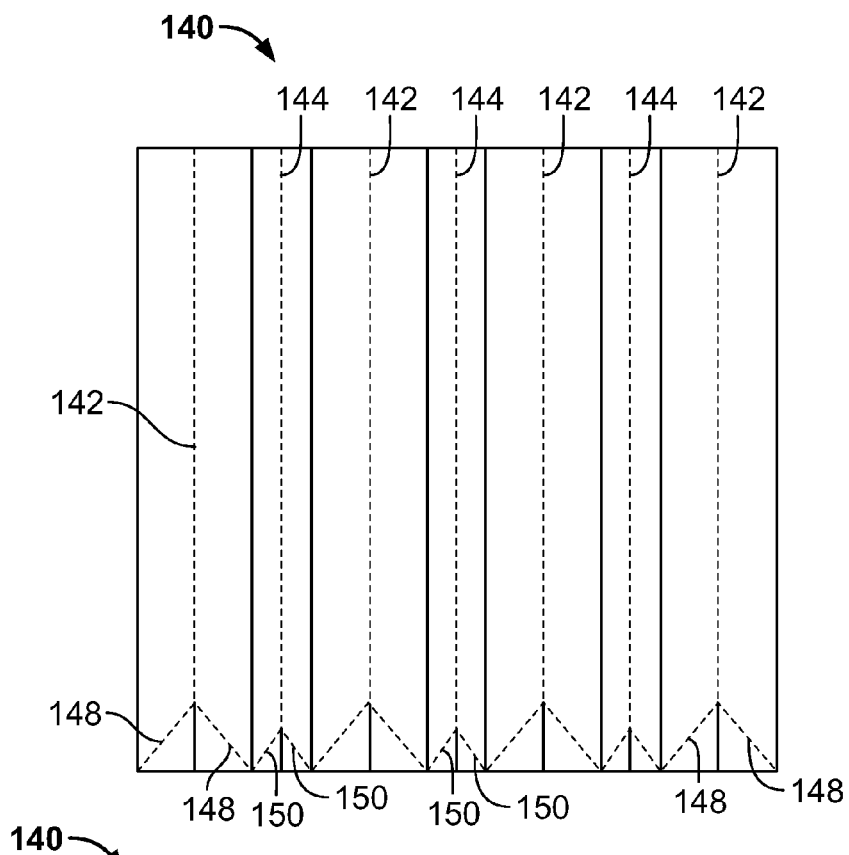
FIG. 26 is a top view of a sheet of filtration medium showing a scoring pattern used to make the filter element of FIGS. 22-25.

FIG. 26 shows a flattened piece of media sheet 140 with the scoring pattern. The solid lines illustrate fold lines that are folded upwardly and out of the paper, while the broken lines illustrate fold lines that are folded downwardly or into the paper. The fold lines 142 form the major pleats 124, while the fold lines 144 form the minor pleats 126.

The diagonal fold lines 148 form the inverted sections 135 for the major pleats 124. The diagonal fold lines 150 form the inverted sections 137 for the minor pleats 126.

Figure 27:
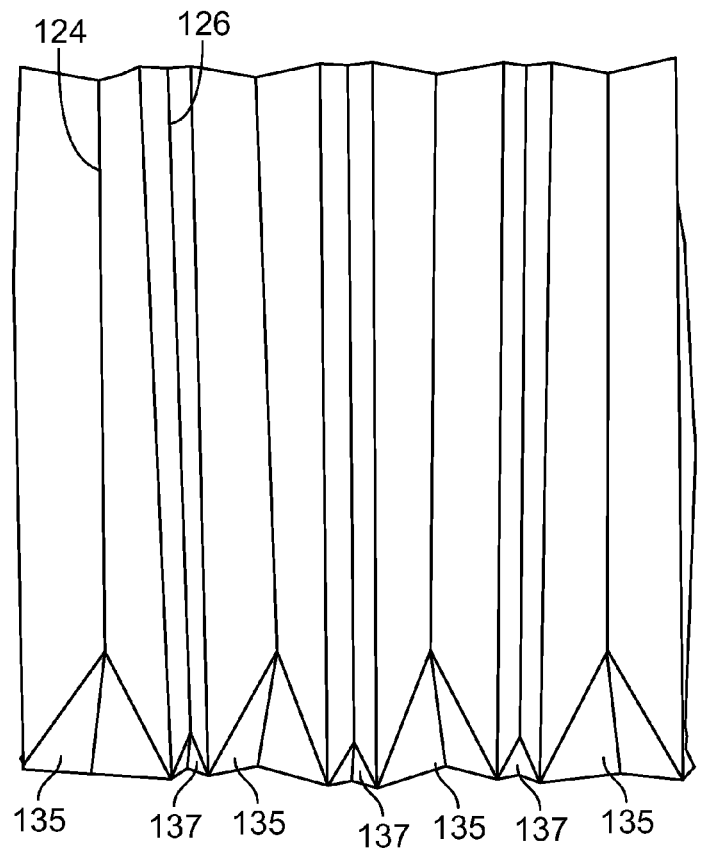
FIG. 27 is a top view of the media of FIG. 26 folded along the scoring pattern, and before it is formed into the filter element of FIGS. 22-25.

FIG. 27 is a top view of the media sheet 140 folded along the score lines of FIG. 26, and before the media sheet 140 is formed into the pleated media pack 102.

Figure 28:
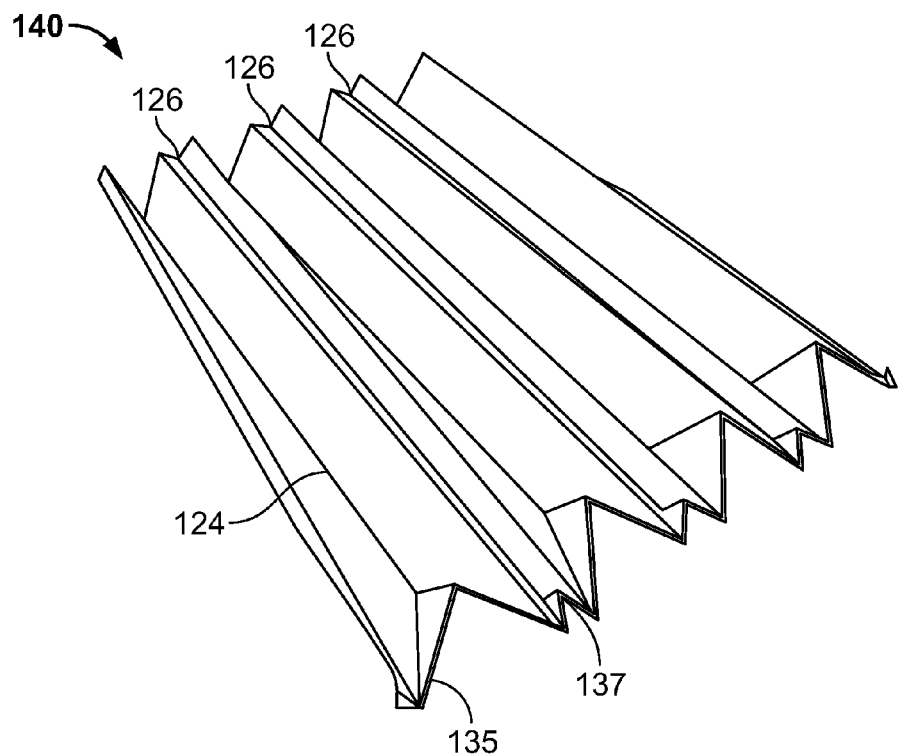
FIG. 28 is a perspective view of the folded media sheet of FIG. 27.
Figure 29:
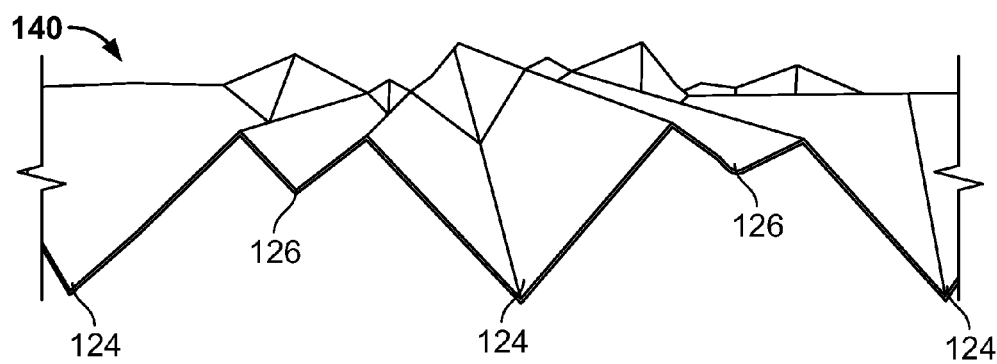
FIG. 29 is one end view of the folded media of FIG. 27.
Figure 30:
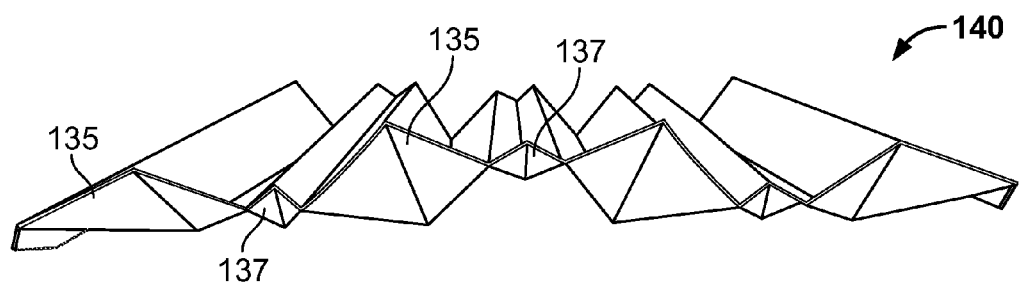
FIG. 30 is an end view of the folded media sheet of FIG. 27 showing the opposite end from the end being shown in FIG. 29.

FIG. 28 is a perspective view of the media sheet 140 of FIG. 27. FIGS. 29 and 30 show opposite end views of the media sheet 140 of FIGS. 27 and 28.

The media sheet 140 can be cellulose with or without fine fiber. Many variations can be used.

The element 100 can also be constructed using the media described in connection with FIGS. 1-21, above, folded to have: a major pleated structure comprising inclined walls that are connected continuously at generally parallel alternating major pleats, said major pleats extending along opposing edges of each inclined wall and said major pleats protruding towards opposing sides of the sheet in alternating fashion; a minor pleated structure formed in each of the inclined walls of the major pleated structure, with alternating minor pleats formed in each of said inclined walls, each of said minor pleats protruding towards opposing sides of the sheet in alternating fashion and each of said minor pleats extending transversely between the major pleats at opposing edges of the inclined wall, with minor pleats of adjacent inclined walls being generally aligned on opposing sides of each major pleat; and indentations formed along each major pleat, each indentation comprising two triangles on opposing sides of a common base line, said base line extending between and being aligned with two minor pleats, said minor pleats being on opposing sides of the major pleat and said minor pleats protruding towards the same side of the sheet as the major pleat, and the apex of each of said two triangles being at the junction of two aligned minor pleats that protrude towards the side of the sheet that is opposite from the side towards which the major pleat protrudes The above represents example principles and embodiments. Many embodiments can be made applying these principles.

What is claimed is:

1. A pleated media pack for use in a filter element; the media pack comprising:
    (a) a section of filtration media folded into pleats; at least some of the pleats having a major pleat depth;
    (b) the section of filtration media being configured into a tube defining an interior volume, first and second opposite ends; and an opening at the first end; the opening having an outer diameter;
    (c) a ratio of the pleat depth to the opening outer diameter being greater than 0.2; and
    (d) wherein at least some of the pleats at the first end are inverted an opposite direction of the rest of the pleat, along only a portion of the pleat length from the first end toward the second end, and each of the pleats at the second end have outer pleat tips extending fully to the second end and are not inverted.

2. The media pack of claim 1 wherein the ratio is not greater than 0.5.

3. The media pack of claim 1 wherein the ratio is between 0.2 and 0.35.

4. The media pack of claim 1 wherein the pleats include major pleats defining the major pleat depth, and minor pleats having a minor pleat depth that is less that the major pleat depth.

5. The media pack of claim 4 wherein the major pleats and minor pleats alternate with each other.

6. The media pack of claim 4 wherein at least some of the major pleats at the first end are inverted an opposite direction of the rest of the pleat, along at least a portion of the pleat length from the first end toward the second end.

7. The media pack of claim 4 wherein at least some of the minor pleats at the first end are inverted an opposite direction of the rest of the pleat, along at least a portion of the pleat length from the first end toward the second end.

8. The media pack of claim 4 wherein the major pleats and minor pleats at the first end are inverted an opposite direction of the rest of the pleat, along at least a portion of the pleat length from the first end toward the second end.

9. The media pack of claim 1 wherein an outer profile shape of the media pack is conical, with a diameter at the first end being greater than a diameter at the second end.

10. A filter element according to claim 1, the filter element comprising:
 (a) a first open end cap secured to the first end of the media pack; and
 (b) a second end cap secured to the second end of the media pack.

11. A filter element according to claim 10 wherein the second end cap is a closed end cap.

12. A filter element according to claim 10 wherein the first open end cap defines an outlet opening for an exit of filtered fluid.

* * * * *